(12) United States Patent
Furuta et al.

(10) Patent No.: US 8,970,747 B2
(45) Date of Patent: Mar. 3, 2015

(54) IMAGING DEVICE

(71) Applicant: FUJIFILM Corporation, Tokyo (JP)

(72) Inventors: Yoshinori Furuta, Saitama (JP); Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/317,766

(22) Filed: Jun. 27, 2014

(65) Prior Publication Data

US 2014/0307130 A1 Oct. 16, 2014

Related U.S. Application Data

(63) Continuation of application No. PCT/JP2012/083595, filed on Dec. 26, 2012.

(30) Foreign Application Priority Data

Dec. 28, 2011 (JP) ................................. 2011-289365

(51) Int. Cl.
  *H04N 5/225* (2006.01)
  *H04N 5/367* (2011.01)
  *H04N 9/04* (2006.01)
(52) U.S. Cl.
  CPC ............... *H04N 5/367* (2013.01); *H04N 9/045* (2013.01)
  USPC .......................................... 348/273; 348/246
(58) Field of Classification Search
  USPC ........................................ 348/246, 273–280
  See application file for complete search history.

(56) References Cited

U.S. PATENT DOCUMENTS 8,023,017 B2 * 9/2011 Hsu ................................ 348/275
8,456,553 B2 * 6/2013 Hayashi et al. ................ 348/273
8,817,141 B2 * 8/2014 Tanaka ............................ 348/273
2001/0048477 A1 * 12/2001 Misawa ......................... 348/272
2005/0151861 A1 * 7/2005 Bornstein et al. ............. 348/275
2008/0278609 A1 11/2008 Otsuki
2009/0027527 A1 1/2009 Pang et al.
2010/0245632 A1 * 9/2010 Suzuki .......................... 348/241
2012/0293695 A1 * 11/2012 Tanaka ........................... 348/280

FOREIGN PATENT DOCUMENTS

| JP | 2000-244934 A | 9/2000 |
|---|---|---|
| JP | 2001-36821 A | 2/2001 |
| JP | 2002-330353 A | 11/2002 |
| JP | 2008-278394 A | 11/2008 |
| JP | 2009-27684 A | 2/2009 |

OTHER PUBLICATIONS

International Search Report, mailed Feb. 5, 2013, issued in PCT/JP2012/083595.
Written Opinion of the International Searching Authority, mailed Feb. 5, 2013, issued in PCT/JP2012/083595.

* cited by examiner

*Primary Examiner* — Twyler Haskins
*Assistant Examiner* — Dwight C Tejano
(74) *Attorney, Agent, or Firm* — Birch, Stewart, Kolasch & Birch, LLP

(57) ABSTRACT

In a color filter array of a color imaging element 26, a G filter 34G to which other G filters 34G are adjacent in horizontal and vertical directions and a G filter 34G to which another G filter 34G is not adjacent are determined as dense and sparse G filters, respectively. Defective information on a sparse G defective pixel corresponding to the sparse G filter is more preferentially registered than defective information on a dense G defective pixel corresponding to the dense G filter. Thereby, interpolation processing for a pixel value of the sparse G defective pixel is more preferentially performed than interpolation processing for a pixel value of the dense G defective pixel.

12 Claims, 33 Drawing Sheets

FIG.15

|   | 1 | 2 | 3 | 4 | 5 | 6 |
|---|---|---|---|---|---|---|
| a | $G_2$ | B | $G_1$ | $G_1$ | R | $G_2$ |
| b | R | $G_2$ | R | B | $G_2$ | B |
| c | $G_1$ | B | $G_1$ | $G_1$ | R | $G_1$ |
| d | $G_1$ | R | ⊠ | $G_1$ | B | $G_1$ |
| e | B | ⊠ | B | R | $G_2$ | R |
| f | $G_2$ | R | $G_1$ | $G_1$ | B | $G_2$ |

20 (COLOR IMAGING ELEMENT)

34B, 34G, 34R, 34G

P (BASIC ARRAY PATTERN)

FIG.26

|   | 1 | 2 | 3 | 4 | 5 | ··· |
|---|---|---|---|---|---|---|
| a |   | <EVALUATION VALUE: 8> ||||  |
| b |   | 1 | 1 | 1 |   |   |
| c |   | 1 | ⊠₁ | 1 |   | ··· |
| d |   | 1 | 1 | 1 |   |   |
| e |   |   |   |   |   |   |
| ⋮ |   |   | ⋮ |   |   |   |

FIG.27

|   | 1 | 2 | 3 | 4 | 5 |
|---|---|---|---|---|---|
| a | <EVALUATION VALUE: 7.5> | | | | |
| b |   | 1 | 1 | 1 |   |
| c |   | 1 | ✗₁ | 1 |   |
| d |   | 0.5 | 1 | 1 |   |
| e | G |   |   |   |   |

FIG.28

|   | 1 | 2 | 3 | 4 | 5 | .... |
|---|---|---|---|---|---|---|
| a |   | <EVALUATION VALUE: 7> | | | | |
| b |   | 1 | 1 | 1 |   | |
| c |   | 1 | ✗1 | 1 |   | .... |
| d |   | 0.33 | 0.67 | 1 |   | |
| e |   | G |   |   |   | |

FIG.29

|   | 1 | 2 | 3 | 4 | 5 | .... |
|---|---|---|---|---|---|---|
| a |   | <EVALUATION VALUE: 6.15> | | | | |
| b |   | 1 | 1 | 1 |   | |
| c |   | 1 | ✗₁ | 1 |   | .... |
| d |   | 0.25 | 0.4 | 0.5 |   | |
| e |   | G | G |   |   | |

FIG.30

|   | 1 | 2 | 3 | 4 | 5 | .... |
|---|---|---|---|---|---|---|
| a |   | <EVALUATION VALUE: 5.66> | | | | |
| b |   | 1 | 1 | 1 |   |   |
| c |   | 1 | ⊠1 | 1 |   | .... |
| d |   | 0.25 | 0.16 | 0.25 |   |   |
| e |   | G | G | G |   |   |

IMAGING DEVICE

CROSS-REFERENCE TO RELATED APPLICATIONS

This application is a Continuation of PCT International Application No. PCT/JP2012/083595 filed on Dec. 26, 2012, which claims priority under 35 U.S.C. §119(a) of Japanese Patent Application No. 2011-289365 filed on Dec. 28, 2011. Each of the above applications is hereby expressly incorporated by reference, in its entirety, into the present application.

BACKGROUND OF THE INVENTION

1. Field of the Invention

The presently disclosed subject matter relates to an imaging device provided with a single-plate type of color imaging element, and in more detail, relates to an imaging device which obtains a pixel value of a defective pixel from a pixel value of a peripheral pixel in a periphery of the defective pixel by interpolation processing.

2. Description of the Related Art

There are many imaging devices such as a digital camera, which are provided with a single-plate type of color imaging element that takes an object image formed on an imaging surface by a photographing optical system. On the imaging surface of the single-plate type of color imaging element, a large number of red (R), green (G) and blue (B) pixels are arrayed according to a predetermined pattern (see Japanese Patent Laid-Open No. 2009-027684). In the single-plate type of color imaging element, color filters each having a single color are provided on each of the pixels, and accordingly each of the pixels has color information only on the single color. Because of this, an output image of the color imaging element becomes an RAW image (mosaic image), and accordingly a multichannel image is obtained by interpolation processing (also referred to as synchronization processing or demosaic processing, hereafter the same) that interpolates a pixel of which the color is lost (hereinafter referred to as missing pixel), from a peripheral pixel.

In the color imaging element, there is the case where such a pixel exists as not to output a signal, or as to output a high level of a dark output due to a dark current or the like, in other words, a so-called defective pixel exists, due to various causes (for instance, crack) in a manufacturing process. At this time, when the peripheral pixel of the missing pixel is a defective pixel, accurate color information on the missing pixel cannot be obtained. Because of this, the pixel value (output value) of the defective pixel is not used, but the interpolation processing is performed which interpolates the pixel value by using a pixel value in a peripheral pixel having the same color as that of the defective pixel, which is positioned in the periphery.

The imaging device described in Japanese Patent Laid-Open No. 2001-036821 performs the interpolation processing when an exposure time is within a standard exposure time, based on a result of having detected the defective pixel, which has been obtained beforehand; and on the other hand, when the exposure time is longer than the standard exposure time, performs a test photography, detects the defective pixel and performs the interpolation processing based on the detection result.

The imaging device described in Japanese Patent Laid-Open No. 2002-330353 detects the defects, stores the defective pixels in EEPROM sequentially from the defective pixel having a higher level of defect; and performs the interpolation processing sequentially from the defective pixel having the higher level of defect, based on the defective pixel information stored in the EEPROM.

SUMMARY OF THE INVENTION

By the way, when a color filter array in a color imaging element is a known Bayer array, a G pixel is arrayed in a checkered shape (checker pattern). Because of this, other G pixels are not arranged so as to be adjacent to an individual G pixel in the horizontal and vertical directions. However, there is the case where a G pixel to which another G pixel is arranged so as to be adjacent in the horizontal and vertical directions (hereinafter referred to as dense G pixel) and a G pixel to which another G pixel is not arranged so as to be adjacent (hereinafter referred to as sparse G pixel) are contained in the color filter array, as is described in FIG. 9 in Japanese Patent Laid-Open No. 2009-027684 and the like.

In this case, when the dense G pixel is the defective pixel, for instance, a G pixel which is arranged so as to be adjacent to this defective pixel in the horizontal and vertical directions does not need to be subjected to the interpolation processing, and accordingly the influence of the defective pixel resists spreading (for instance, see FIG. 5). On the contrary, when the sparse G pixel is the defective pixel, an R pixel or a B pixel is arranged so as to be adjacent to the G pixel in the horizontal and vertical directions, and the pixel values of the G pixels (missing pixel) which correspond to the positions of these RB pixels need to be obtained by the interpolation processing. Because of this, when the sparse pixel is the defective pixel, the influence of this defective pixel tends to easily spread (for instance, see FIG. 6).

When the interpolation processing of the pixel value of the defective pixel in the color imaging element is performed, it is preferable that the interpolation processing is performed for the pixel values of all the defective pixels by using pixel values of the peripheral pixels having the same colors, respectively. However, because the number of the defective pixels has increased along with a tendency that a recent color imaging element has higher resolution, when the information concerning all of the defective pixels is registered in a memory or the like and the interpolation processing is performed, a capacity of the required memory becomes enormous. Furthermore, in this case, it takes a time period for the processing and accordingly the above method is not practical. Accordingly, the imaging device does not usually perform the interpolation processing for all of the defective pixels.

In this case, when the defective pixel which has not been subjected to the interpolation processing is the sparse G pixel, the influence tends to more easily spread than the case of the dense G pixel, and accordingly the influence on the photographed image becomes larger. In the above described Japanese Patent Laid-Open No. 2009-027684, Japanese Patent Laid-Open No. 2001-036821 and Japanese Patent Laid-Open No. 2002-330353, it is not taken into consideration at all that the influences exerting onto the photographed image are different between the case where the sparse pixel is the defective pixel and the case where the dense pixel is the defective pixel. Accordingly, the quality of the photographed image which originates in the defect of the sparse pixel may be lowered.

An object of the presently disclosed subject matter is to provide an imaging device which can provide an adequate photographed image.

In order to achieve the above described object, the invention according to the first aspect of the presently disclosed subject matter includes: a color imaging element in which color filters of a plurality of colors are arranged on a plurality of pixels that are formed of photoelectric conversion elements, respectively, which are arrayed in a horizontal direction and a vertical direction, in accordance with a predetermined color filter array, wherein color filters of at least one color include a sparse filter in which a first adjacent number of adjacent color filters having a same color in the horizontal direction and vertical direction is relatively small, or a second adjacent number of adjacent color filters having a same color in an oblique direction is relatively small, when both of the first adjacent number is M (0≤M≤4), and a dense filter in which the first adjacent number or the second adjacent number is relatively large, and the plurality of pixels include a sparse pixel corresponding to the sparse filter and a dense pixel corresponding to the dense filter; an acquiring unit configured to acquire a piece of defective pixel information concerning a defective pixel that is included in the plurality of pixels and includes a sparse defective pixel corresponding to the sparse filter and a dense defective pixel corresponding to the dense filter; and an interpolating unit configured to determine a pixel value of the defective pixel from a pixel value of a peripheral pixel which is positioned in a lower part of the color filter that is in a periphery of the defective pixel and has a same color as that of the defective pixel by interpolation processing based on the piece of defective pixel information which has been acquired by the acquiring unit, the interpolating unit configured to set a second ratio of the sparse defective pixel to be interpolated with respect to a total pixel number of the sparse pixels so as to become higher than a first ratio of the dense defective pixel to be interpolated with respect to a total pixel number of the dense pixels.

An imaging device according to another aspect of the presently disclosed subject matter includes a defective pixel information memory unit configured to register pieces of defective pixel information therein, and set a ratio of a registration number of the pieces of defective pixel information on the sparse defective pixel with respect to the total pixel number of the sparse pixels so as to become higher than a ratio of a registration number of the pieces of defective pixel information on the dense defective pixel with respect to the total pixel number of the dense pixels, wherein the acquiring unit acquires the piece of defective pixel information from the defective pixel information memory unit. Thereby, by interpolating the dense defective pixel and the sparse defective pixel based on the defective pixel information which is registered in the defective pixel information memory unit, and thereby can set the second ratio so as to become higher than the first ratio.

In an imaging device according to further another aspect of the presently disclosed subject matter, the defective pixel information memory unit has the piece of defective pixel information on the defective pixel registered therein which occurs in any one of each photographing condition when photographing conditions have been changed, and the acquiring unit acquires a piece of defective pixel information which corresponds to the photographing condition, from the defective pixel information memory unit. Thereby, even when the dark output of the pixel increases or decreases according to the photographing condition, interpolation of the pixel can be performed based on the defective pixel information which corresponds to the photographing condition.

In an imaging device according to further another aspect of the presently disclosed subject matter, the photographing condition preferably includes at least one of a gain, an exposure time, and a temperature of the color imaging element.

In an imaging device according to further another aspect of the presently disclosed subject matter, the color filter array preferably has a square array in which color filters of one color are arranged so as to be adjacent to each other in an array pattern corresponding to 2×2 pixels, and an isolated array in which a color filter of one color is arranged so as to be adjacent to color filters of other colors different from the one color in the horizontal direction and the vertical direction. Thereby, the sparse filter and the dense filter are included in the color filter array.

In an imaging device according to further another aspect of the presently disclosed subject matter, the color filters of the one color are a first filter corresponding to a first color which contributes most to an acquisition of a luminance signal, the color filter array includes a basic array pattern in which the first filter and a second filter corresponding to a second color which includes two or more colors other than the first color are arrayed in an array pattern corresponding to N×N (N: 3 or larger odd number) pixels, and the basic array pattern is preferably arranged repeatedly in the horizontal direction and the vertical direction. In addition, the first filter is arranged on two diagonal lines in the basic array pattern, and the color filter array preferably includes a square array that is an array pattern corresponding to 2×2 pixels or more, which are formed of the first filter. Thereby, the sparse filter and the dense filter are included in the color filter array.

In an imaging device according to further another aspect of the presently disclosed subject matter, the plurality of pixels include a plurality of first continuous pixels in which the sparse pixel and the dense pixel are adjacent to each other in any of each direction of the horizontal, vertical and oblique directions, and when the defective pixel includes first continuous defective pixels in which the sparse defective pixel and the dense defective pixel are adjacent to each other in any of each direction, based on the piece of defective pixel information, the interpolating unit preferably sets a third ratio of first continuous defective pixels to be interpolated with respect to a total number of the first continuous pixels so as to become higher than the second ratio. Thereby, the interpolation processing is preferentially performed for the first continuous defective pixels which have a strong influence on the quality of photographed image data. As a result, adequate photographed image data are obtained.

In an imaging device according to further another aspect of the presently disclosed subject matter, the plurality of pixels include a plurality of second continuous pixels in which the two sparse pixels are close to each other in any of each direction of the horizontal, vertical and oblique directions, and when the defective pixel includes the second continuous defective pixels in which the two sparse defective pixels are close to each other in any of the each direction, based on the piece of defective pixel information, the interpolating unit preferably sets a fourth ratio of second continuous defective pixels to be interpolated with respect to a total number of the second continuous pixels so as to become higher than the second ratio. Thereby, the interpolation processing is preferentially performed for the second continuous defective pixels which have a strong influence on the quality of the photographed image data. As a result, the adequate photographed image data are obtained.

In an imaging device according to further another aspect of the presently disclosed subject matter, the plurality of pixels include a plurality of third continuous pixels in which two of the dense pixels are adjacent or close to each other in any of each direction of the horizontal, vertical and oblique directions, and when the defective pixel includes third continuous defective pixels in which the two of the dense defective pixels are adjacent or close to each other in any of the each direction, based on the piece of defective pixel information, the interpolating unit sets a fifth ratio of the third continuous defective pixels to be interpolated with respect to the total number of the third continuous pixels so as to become higher than the second ratio. Thereby, the interpolation processing is preferentially performed for the third continuous defective pixels which have a strong influence on the quality of the photographed image data. As a result, the adequate photographed image data are obtained.

In an imaging device according to further another aspect of the presently disclosed subject matter, a plurality of pixels include the plurality of first continuous pixels in which the sparse pixel and the dense pixel are adjacent to each other in any of each direction of the horizontal, vertical and oblique directions, and a plurality of second continuous pixels in which two of the sparse pixels are close to each other in any of the each direction, and when the defective pixel includes the first continuous defective pixels in which the sparse defective pixel and the dense defective pixel are adjacent to each other in any of the each direction, and the second continuous defective pixels in which the two of the sparse defective pixels are close to each other in any of the each direction, based on the piece of defective pixel information, the interpolating unit preferably sets a fourth ratio of the second continuous defective pixels to be interpolated with respect to a total number of the second continuous pixels so as to become higher than a third ratio of the first continuous defective pixels to be interpolated with respect to a total number of the first continuous pixels. Thereby, the interpolation processing is preferentially performed for the second continuous defective pixels which have a possibility of being recognized as one large linear defect if the second continuous defective pixels are not subjected to the interpolation processing, and accordingly the adequate photographed image data are obtained.

In an imaging device according to further another aspect of the presently disclosed subject matter, a plurality of pixels include the plurality of third continuous pixels in which two of the dense pixels are adjacent or close to each other in any of each direction of the horizontal, vertical and oblique directions, and when the defective pixel includes the first continuous defective pixels, the second continuous defective pixels and the third continuous defective pixels in which the two of the dense defective pixels are adjacent or close to each other in any of the each direction, based on the piece of defective pixel information, the interpolating unit preferably sets a fifth ratio of the third continuous defective pixels to be interpolated with respect to a total number of the third continuous pixels so as to be lower than the third ratio and the fourth ratio.

According to the imaging device of the presently disclosed subject matter, when the pixel value of the defective pixel is subjected to the interpolation processing, a ratio of the sparse defective pixel to be interpolated with respect to the total pixel number of the sparse pixels is set to become higher than a ratio of the dense defective pixel to be interpolated with respect to the total pixel number of the dense pixels, and accordingly the sparse defective pixel which has a strong influence on the quality of the photographed image data is more preferentially interpolated than the dense defective pixel. Because of this, the influence of the sparse defective pixel giving on the photographed image data can be reduced even though all the defective pixels have not been subjected to interpolation, from the viewpoint of the upper limit of the memory capacity of the defective pixel information and the prevention of the increase in the processing period of time to be spent on the interpolation processing. As a result, the adequate photographed image data are obtained.

BRIEF DESCRIPTION OF THE DRAWINGS

FIG. 15 is an explanatory drawing for describing sparse-dense G defective pixels;

FIG. 26 is an explanatory drawing for describing a first example of the calculation of an evaluation value;

FIG. 27 is an explanatory drawing for describing a second example of the calculation of the evaluation value;

FIG. 28 is an explanatory drawing for describing a third example of the calculation of the evaluation value;

FIG. 29 is an explanatory drawing for describing a fourth example of the calculation of the evaluation value;

FIG. 30 is an explanatory drawing for describing a fifth example of the calculation of the evaluation value;

DETAILED DESCRIPTION OF EXEMPLARY EMBODIMENTS

Whole Configuration of Digital Camera of First Embodiment

Figure 1:
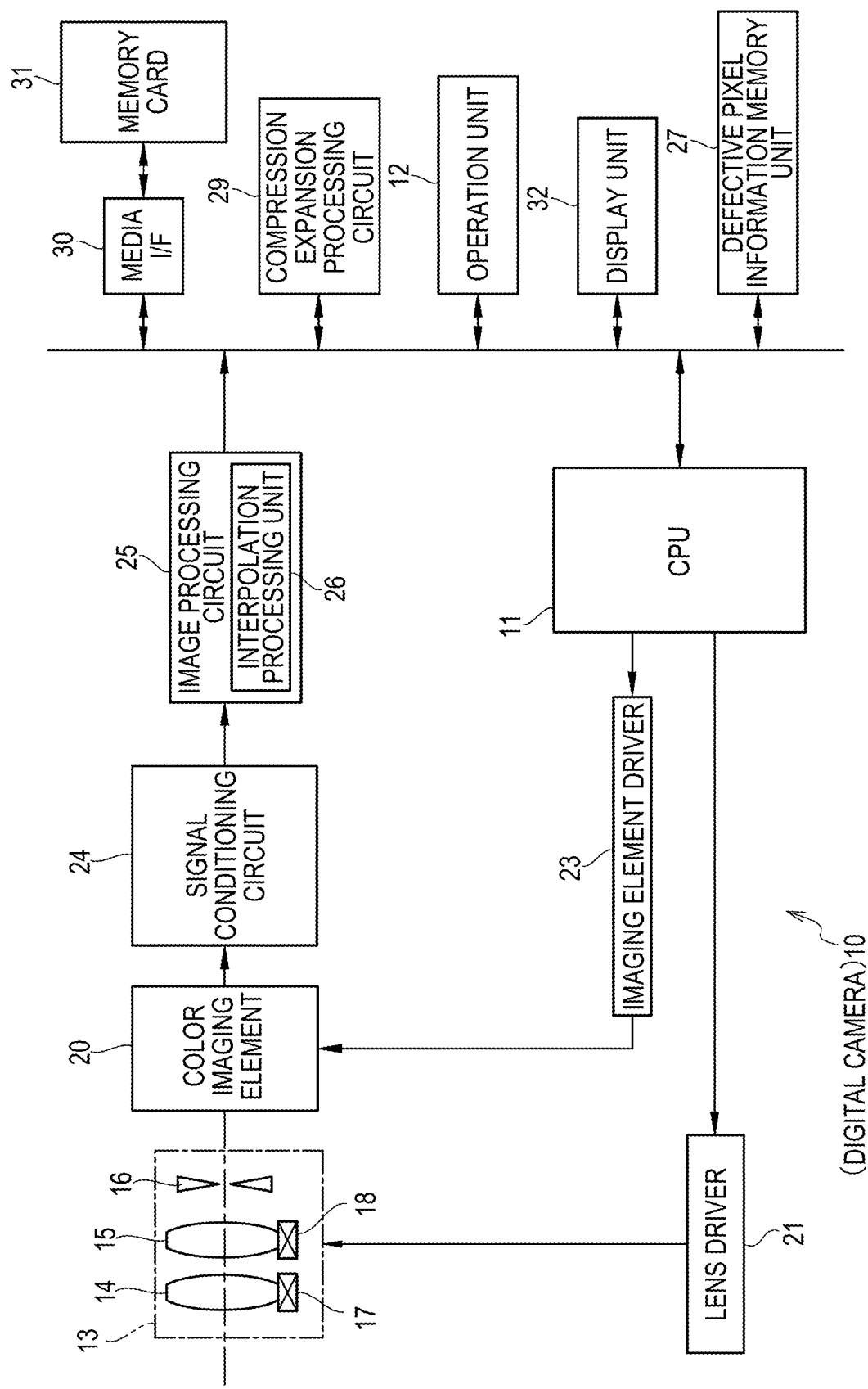
FIG. 1 is a block diagram illustrating an electric configuration of a digital camera of a first embodiment.

As is illustrated in FIG. 1, a CPU 11 of a digital camera (imaging device) 10 according to a first embodiment of the presently disclosed subject matter sequentially performs various programs and data which have been read out from a memory which is not illustrated, based on a control signal sent from an operation unit 12 which includes a shutter button or a shutter switch and various operation buttons, and collectively controls each unit of the digital camera 10.

In a lens unit 13, a zoom lens 14, a focus lens 15, a mechanical shutter 16 and the like are incorporated. The zoom lens 14 and the focus lens 15 are driven by a zoom mechanism 17 and a focus mechanism 18, respectively, and are moved forward and backward along an optical axis of both the lenses 14 and 15.

The mechanical shutter 16 has a movable unit (of which illustration is omitted) which moves between a closing position at which the light of an object is prevented from being incident on a color imaging element 20 and an open position at which the light of the object is permitted to be incident. The mechanical shutter 16 opens/closes an optical path which reaches the color imaging element 20 from each of the lenses 14 and 15, by moving the movable unit to each of the positions. Incidentally, the mechanical shutter 16 includes a diaphragm which controls the light quantity of the light of the object, which is incident on the color imaging element 20. The operations of the mechanical shutter 16, the zoom mechanism 17 and the focus mechanism 18 are controlled by the CPU 11 through a lens driver 21.

A single-plate type of color imaging element 20 is arranged in the rear of the lens unit 13. The color imaging element 20 converts the light of the object, which is incident from each of the lenses 14 and 15, into an electric output signal, and outputs the signal. Incidentally, the color imaging element 20 may be any of various types of imaging elements such as a CCD (Charge Coupled Device) color imaging element and a CMOS (Complementary Metal Oxide Semiconductor) color imaging element. An imaging element driver 23 controls the driving of the color imaging element 20 under the control of the CPU 11.

A signal conditioning circuit 24 has a correlation double sampling processing circuit, an automatic gain correcting circuit and the like, and subjects a signal output from the color imaging element 20 to correlation double sampling processing and gain amplification processing.

An image processing circuit 25 subjects the output signal which is input from the signal conditioning circuit 24, to various processes such as gradation conversion, white balance correction, γ correction processing and pixel interpolation processing, and generates image data. This image processing circuit 25 has an interpolation processing unit (acquiring unit and interpolating unit) 26 provided therein.

The interpolation processing unit 26 acquires information memorized in a defective pixel information memory unit (hereinafter abbreviated as memory unit) 27, which corresponds to the defective pixel information memory unit of the presently disclosed subject matter, and subjects the pixel value (output value) of the defective pixel to the interpolation processing which uses a pixel value of a peripheral pixel that is positioned in the periphery. Incidentally, "acquisition" described here includes "referencing" to the information which is memorized in the memory unit 27. In addition, the interpolation processing unit 26 subjects the previously described pixel value of the missing pixel to the interpolation processing which uses the pixel value of the peripheral pixel.

A compression expansion processing circuit 29 subjects the image data which have been processed in the image processing circuit 25, to compression processing. The compression expansion processing circuit 29 also subjects the compressed image data which have been obtained from a memory card 31, to expansion processing through a media I/F 30. The media I/F 30 records and reads out the image data in and from the memory card 31. A display unit 32 is a liquid crystal display or the like, and displays a through image, a reproduced image and the like.

Incidentally, the digital camera 10 has an AF detection circuit for autofocus, an AE detection circuit and the like provided therein, though the illustration is omitted. The CPU 11 drives the focus mechanism 18 through the lens driver 21 based on the detection result of the AF detection circuit, and thereby performs AF processing. The CPU 11 also drives the mechanical shutter 16 through the lens driver 21 based on the detection result of the AE detection circuit, and thereby performs AE processing.

Configuration of Color Imaging Element

Figure 2:
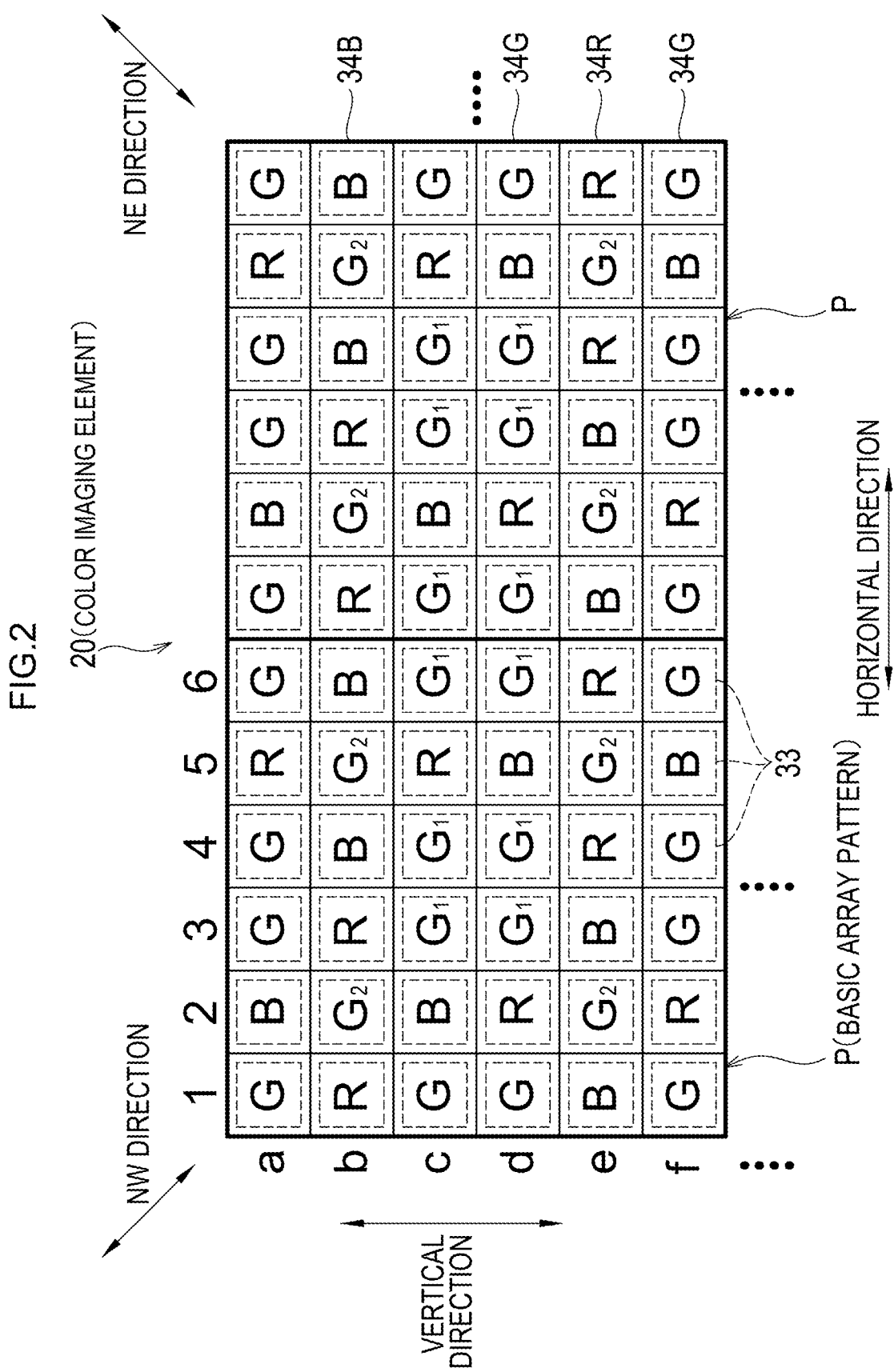
FIG. 2 is a schematic diagram of a color imaging element of the first embodiment.
Figure 3:
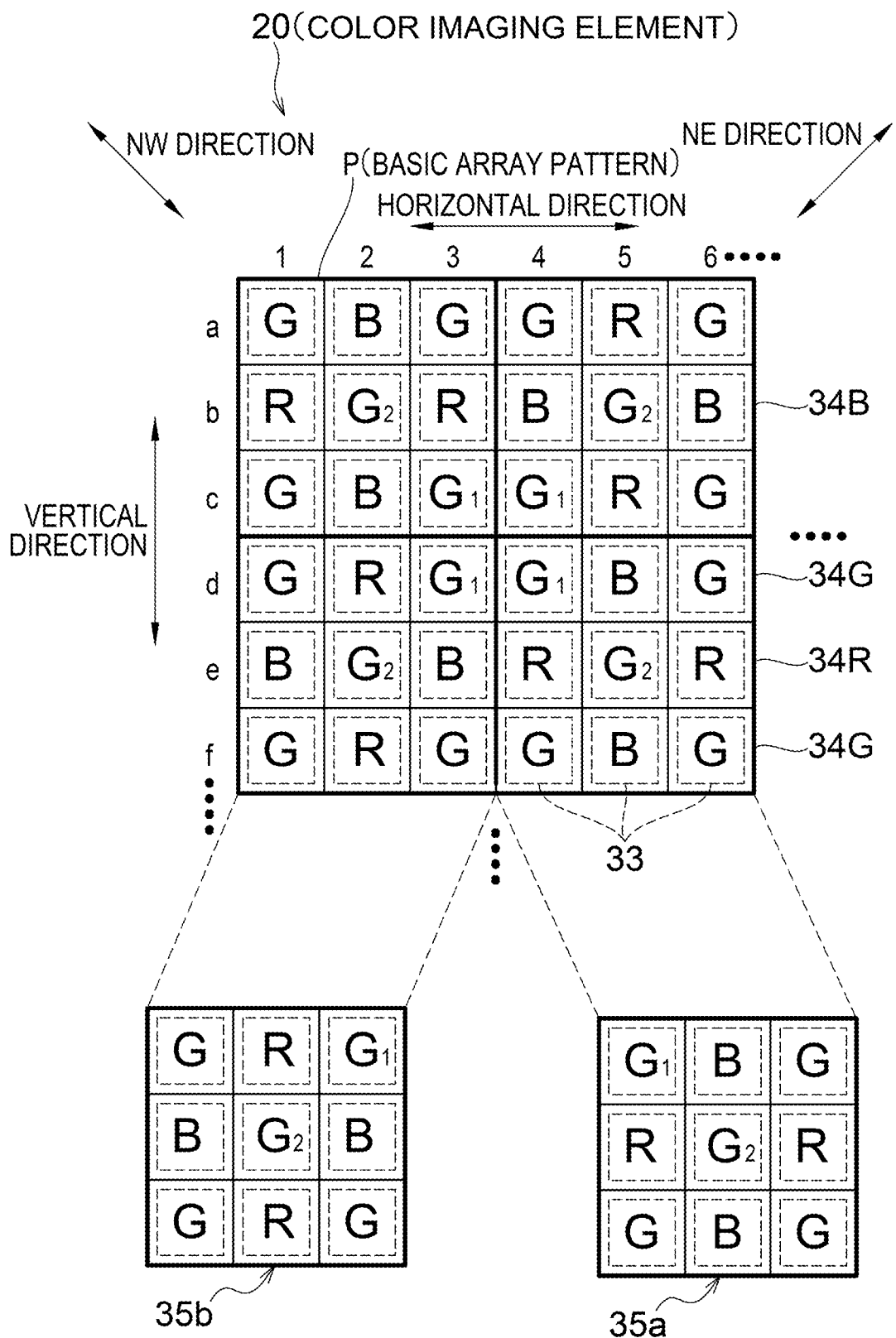
FIG. 3 is a schematic diagram of a basic array pattern which constitutes a color filter array of the color imaging element.

As is illustrated in FIG. 2 and FIG. 3, the color imaging element 20 includes a plurality of pixels which have each a photoelectric conversion element 33 therein and are arrayed in a horizontal direction and a vertical direction (two-dimensional array), and color filters which are each arranged above a light-receiving surface of each of the pixels and in a predetermined color filter array. Here, the "above" means a direction in a side from which the light of the object is incident on an imaging surface of the color imaging element 20. For information, the "below" is an opposite side to the "above".

Above each of the pixels, any of the color filters of trichromatic colors of RGB (hereinafter referred to as R filter, G filter and B filter) 34R, 34G and 34B is arranged. Incidentally, the G filter 34G corresponds to the first filter of the presently disclosed subject matter, and the R filter 34R and the B filter 34B correspond to the second filter of the presently disclosed subject matter.

Hereafter, a pixel having the R filter 34R arranged thereon is referred to as "R pixel", a pixel having the G filter 34G arranged thereon is referred to as "G pixel", and a pixel having the B filter 34B arranged thereon is referred to as "B pixel". Incidentally, in the figure, "a, b, c, d, e, f, . . ." and "1, 2, 3, 4, 5, 6, . . ." represent an address of the RGB pixels. In addition, a subscript ($G_{\text{``}1\text{''}}$ and $G_{\text{``}2\text{''}}$) of the G filter 34G in the figure will be Feature of Color Filter Array The color filter array of the color imaging element 20 (hereinafter referred to simply as color filter array) has the following features (1), (2), (3), (4), (5) and (6).

Feature (1)

The color filter array includes a basic array pattern P (pattern illustrated by thick frame in figure) formed of a square array pattern corresponding to 6×6 pixels, and this basic array pattern P is arranged so as to be repeated in a horizontal direction and a vertical direction. Specifically, in this color filter array, the R filter 34R, the G filter 34G and the B filter 34B are arrayed while having predetermined periodicity.

Because the R filter 34R, the G filter 34G and the B filter 34B are thus arrayed while having the predetermined periodicity, when the R, G and B signals which are read out from the color imaging element 20 are subjected to synchronization processing (demosaic processing) and the like, the signals can be processed according to a repeated pattern, as compared to a conventionally known random array.

In addition, when an image is subjected to thinning-out processing with a unit of the basic array pattern P and is reduced, the color filter array which has been subjected to the thinning-out processing can be set at the same color filter array as that before the thinning-out processing, and a common processing circuit can be used.

Feature (2)

In the color filter array, one or more of the G filters 34G corresponding to the color (in this embodiment, color of G) which contributes most to the acquisition of a luminance signal are arranged in each of the lines in the horizontal, vertical and oblique (NE and NW) directions of the color filter array. Here, NE means obliquely upper-right and obliquely lower-left directions, and NW means obliquely lower-right and obliquely upper-left directions. In the case of the square array of pixels, for instance, the oblique (NE and NW) directions become directions of 45 degrees with respect to the horizontal direction, respectively, but if the array is a rectangular array of pixels, the directions become directions of diagonal lines of the rectangle. The angle can vary depending on the lengths of a long side and a short side.

The G filters 34G corresponding to a luminance-based pixel are arranged in each of the lines in the horizontal, vertical and oblique (NE and NW) directions of the color filter array, and accordingly a reproduction accuracy of pixel interpolation processing (synchronization processing and the like) in a high frequency region can be enhanced regardless of a direction in which a high frequency occurs.

Feature (3)

In the basic array pattern P, the pixel numbers of the R pixels, the G pixels and the B pixels are 8 pixels, 20 pixels and 8 pixels, respectively. Specifically, a ratio of each of the pixel numbers of the RGB pixels is 2:5:2, and a ratio of the pixel number of the G pixels becomes larger than ratios of each of the pixel numbers of the R pixels and the B pixels which have the other colors.

The ratio of the pixel number of the G pixels is different from the pixel numbers of the R and B pixels as has been described above, and the ratio of the pixel number particularly of the G pixel which contributes most to the acquisition of the luminance signal is set to be larger than the ratios of the pixel numbers of the R and B pixels. Because of this, aliasing in the pixel interpolation processing (synchronization processing and the like) can be suppressed, and high frequency reproducibility also can be enhanced.

Feature (4)

In the color filter array, one or more of the R filter 34R and the B filter 34B which correspond to other colors of two or more colors (in this embodiment, colors of R and B) except for the color of G are arranged in each of the lines in the horizontal and vertical directions of the color filter array, in the basic array pattern P.

The R filter 34R and the B filter 34B are arranged in the lines in the horizontal and vertical directions of the color filter array, respectively, and accordingly the occurrence of color moire (false color) can be reduced. Thereby, it can become unnecessary to arrange an optical low pass filter for suppressing the occurrence of the false color in an optical path between the incidence surface and the imaging surface of the optical system, and even when the optical low pass filter is applied, the optical low pass filter to be applied may have a weak function of shielding a high-frequency component for preventing the occurrence of the false color. Thereby, the resolution can be prevented from being impaired.

The basic array pattern P can be regarded as an array in which an A array 35a of 3×3 pixels and a B array 35b of 3×3 pixels are alternately arranged in the horizontal and vertical directions.

In the A array 35a and the B array 35b, the G filters 34G are arranged at four corners and the center, and are arranged on both of diagonal lines. In addition, in the A array 35a, the R filter 34R is arrayed in the horizontal direction and the B filter 34B is arrayed in the vertical direction, so as to sandwich the G filter 34G in the center. On the other hand, the B array 35b is an array in which the R filter 34R and the B filter 34B are arranged in a way reverse to the A array 35a.

In addition, the A array 35a and the B array 35b are alternately arranged in the horizontal and vertical directions, and thereby the G filters 34G at the four corners of the A array 35a and the B array 35b form the G filters 34G of the square array corresponding to 2×2 pixels.

The G filters 34G of the square array which correspond to 2×2 pixels, in other words, the G filter 34G to which the other G filters 34G are arranged so as to be adjacent in the horizontal and vertical directions is hereafter referred to as "dense G filter 34G", and is represented by "$G_1$" in the figure. In addition, the G pixel corresponding to the dense G filter 34G is referred to as "dense G pixel."

On the other hand, the G filter 34G in the center of the A array 35a and the B array 35b becomes an isolated array which is arranged so as to be adjacent to the R and B filters 34R and 34B of the different colors in the horizontal and vertical directions. Such a G filter 34G to which another G filter 34G is not arranged so as to be adjacent in the horizontal and vertical directions is hereafter referred to as "sparse G filter 34G", and is represented by "$G_2$" in the figure. In addition, the G pixel corresponding to the sparse G filter 34G is referred to as "sparse G pixel".

Incidentally, in the color filter array of the color imaging element 20, the R and B filters 34R and 34B each do not have the color filter of the same color arranged in the horizontal and vertical directions.

Feature (5)

The color filter array includes a square array corresponding to 2×2 pixels in which the dense G filters 34G are provided, as has been described above. The 2×2 pixels in which such dense G filters 34G are provided are taken out, and an absolute value of a difference between the pixel values of the G pixels in the horizontal direction, an absolute value of a difference between the pixel values of the G pixels in the vertical direction, and an absolute value of a difference between the pixel values of the G pixels in the oblique direction (NE and NW) are determined. Thereby, it can be determined that there is correlation in a direction having a small absolute value of the difference, out of the horizontal direction, the vertical direction and the oblique direction.

Specifically, according to this color filter array, it can be discriminated which direction has a high correlation out of the horizontal direction, the vertical direction and the oblique direction, with the use of information on the G pixel having the smallest pixel spacing. This direction discrimination result can be used in the interpolation processing (synchronization processing and the like) which interpolates the defective pixel from the peripheral pixel.

Feature (6)

The basic array pattern P is point-symmetrical with respect to its center (center of four dense G filters 34G). In addition, the A array 35a and the B array 35b in the basic array pattern P are also point-symmetrical with respect to the central G filters 34G, respectively. Such a symmetry enables a processing circuit in the latter stage to be scaled down or to be simplified.

Configuration Concerning Defective Pixel Information Memory Unit

Figure 4:
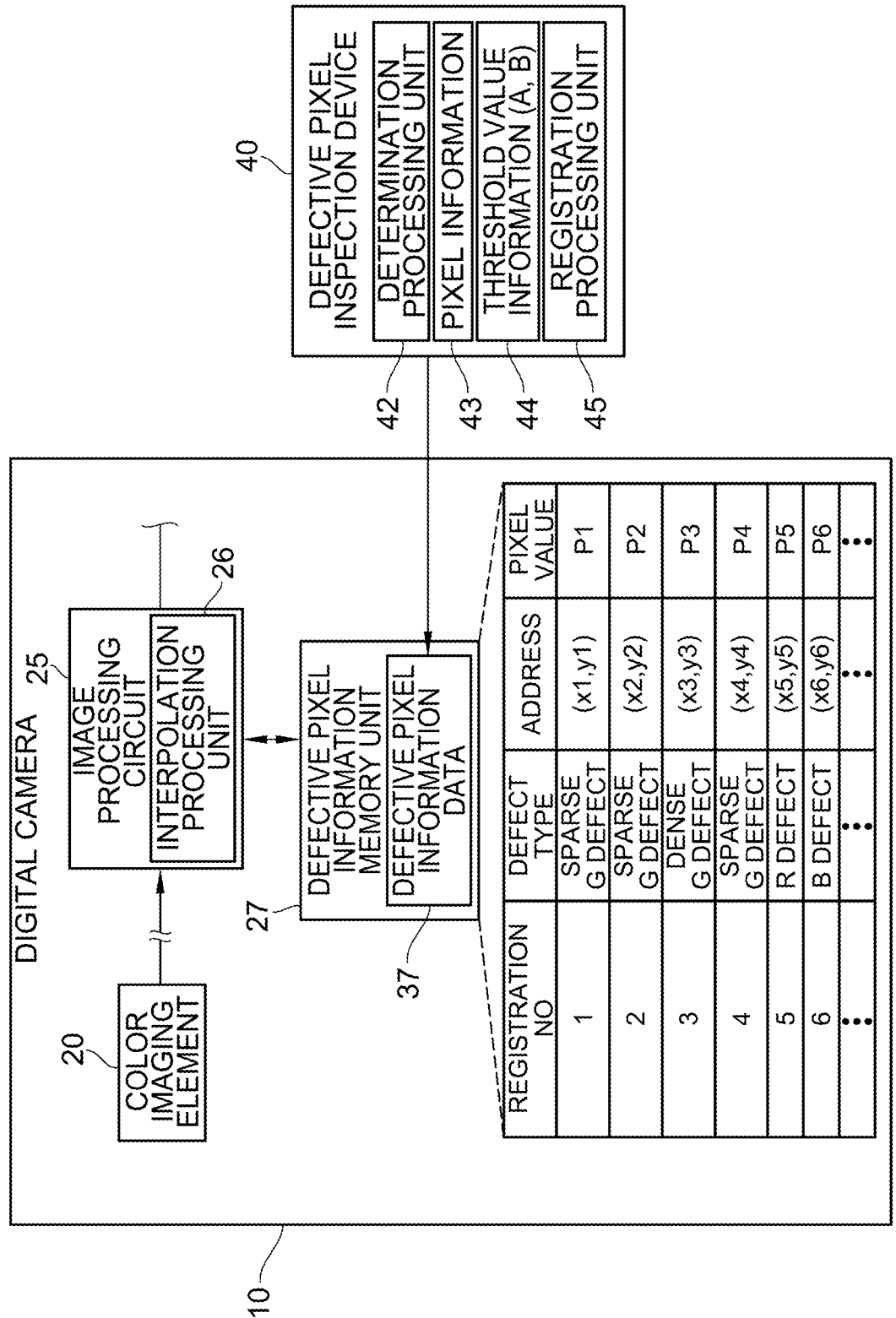
FIG. 4 is a block diagram illustrating a configuration concerning pixel interpolation processing of the digital camera.

As is illustrated in FIG. 4, in the memory unit 27, defective pixel information data 37 concerning the defective pixel in the color imaging element 20 are memorized. In the defective pixel information data, "registration No", "defect type", "address" and "pixel value" are registered for each of the defective pixels as individual defective pixel information (hereinafter referred to simply as defective pixel information).

"Registration No" represents the order in which the data have been registered in the defective pixel information data 37. In addition, "defect type" represents the type of the defective pixel. When the defective pixel is a dense G pixel, the defective pixel is registered as the dense G defective pixel; when being a sparse G pixel, the defective pixel is registered as the sparse G defective pixel; when being an R pixel, the defective pixel is registered as the R defective pixel; and when being a B pixel, the defective pixel is registered as the B defective pixel. Incidentally, in the following description, the defective pixel of the G pixels including the dense G defective pixel and the sparse G defective pixel is referred to as "G defective pixel".

"Address" is an address [coordinate (X, Y)] of the defective pixel on the imaging surface of the color imaging element 20. For instance, the X coordinate (x1, x2, . . . ) is represented by any of "1, 2, 3 . . . " which are illustrated in FIG. 2 and FIG. 3, and the Y coordinate (y1, y2, . . . ) is represented by any of "a, b, c . . . ". In addition, "pixel value" is a pixel value of the defective pixel which has been detected when the defective pixel is inspected, which will be described later.

Information concerning all the defective pixels in the color imaging element 20 cannot be registered in the defective pixel information data 37, because of a memory capacity of the memory unit 27, and an upper limit is set for the registration number. Incidentally, the ratio of each of the pixel numbers of the RGB pixels is 2:5:2 as has been described above, and accordingly, in the present embodiment, it shall be determined that "upper limit number of registration of G defective pixels">"upper limit number of registration of R defective pixels"="upper limit number of registration of B defective pixels" holds, for instance. The defective pixel information described above is registered in the defective pixel information data 37, for instance, by a defective pixel inspection device (hereinafter abbreviated simply as inspection device) 40 in an inspection process in a manufacturing maker of a digital camera 10.

Configuration Concerning Defective Pixel Inspection Device

The inspection device 40 inspects whether the pixel is a defective pixel or not for each of all the pixels in the color imaging element 20, and registers the defective pixel information concerning the defective pixel in the defective pixel information data 37. At this time, "sparse G defective pixel" is more preferentially registered in the defective pixel information data 37 than "dense G defective pixel". Here, "preferential" registration means that when a ratio of "registration number of dense G defective pixels" with respect to "total pixel number of dense G pixels" is represented by R1, and a ratio of "registration number of sparse G defective pixels" with respect to "total pixel number of sparse G pixels" is represented by R2, the defective pixels are registered so as to satisfy R1<R2.

The reason why "sparse G defective pixel" is more preferentially registered in the defective pixel information data 37 than "dense G defective pixel" is described below.

Figure 5:
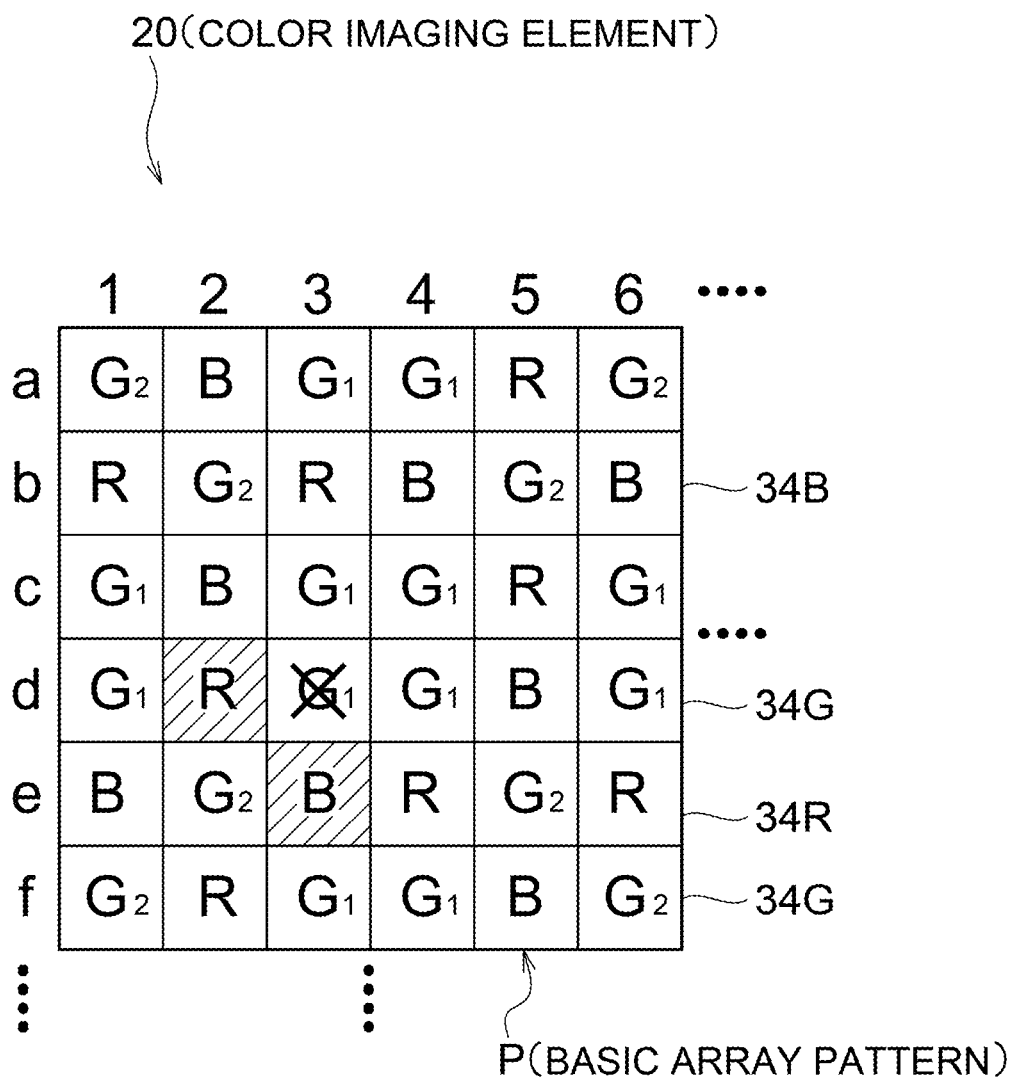
FIG. 5 is an explanatory drawing for describing an influence of a dense G defective pixel on a peripheral pixel.

As is illustrated in FIG. 5, when the dense G pixel in an address (3, d) is a dense G defective pixel (in the figure, pixel designated by x mark), the G pixel (dense G pixel) which is arranged so as to be adjacent thereto in the horizontal and vertical directions does not become a missing pixel. In this case, the pixel values of the G pixels (hereinafter referred to as missing G pixel) which correspond to the positions of two R and B pixels that are adjacent to the dense G defective pixel in the horizontal and vertical directions, (which are illustrated by hatching in the figure), are subjected to the interpolation processing which uses the pixel value of the G defective pixel. Because of this, the pixel values of pixels which are particularly strongly affected by the dense G defective pixel are the pixel values of the two missing G pixels. Therefore, the influence of the dense G defective pixel resists spreading.

Figure 6:
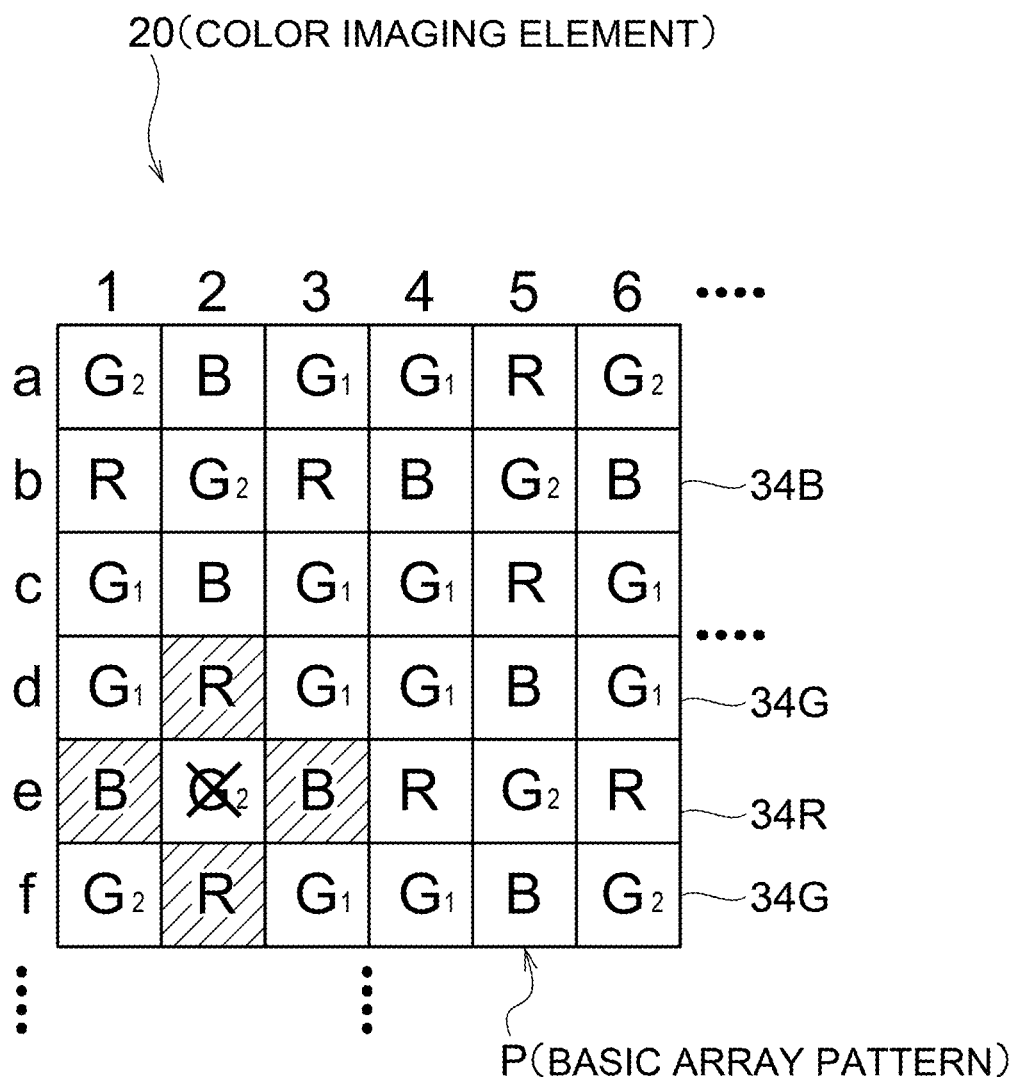
FIG. 6 is an explanatory drawing for describing an influence of a sparse G defective pixel on the peripheral pixel.

On the other hand, as is illustrated in FIG. 6, when the sparse G pixel in an address (2, e) is the sparse G defective pixel, four pixels adjacent in the horizontal and vertical directions are the R pixel and the B pixel, and accordingly the pixel values of the missing G pixels which correspond to the positions of these four adjacent pixels need to be subjected to the interpolation processing which uses the pixel value of the G defective pixel. The pixel value which is calculated by the pixel interpolation is strongly affected by the pixel value of the pixels adjacent in the horizontal and vertical directions, and accordingly the sparse G defective pixel exerts an influence on the pixel values of the missing G pixels corresponding to the positions of the four adjacent pixels. Because of this, the influence of the sparse G defective pixel tends to more easily spread than that of the dense G defective pixel, the influence on the photographed image becomes larger, and accordingly the defective pixel information of the sparse G defective pixel is more preferentially registered than the defect information of the dense G defective pixel.

The description returns to FIG. 4. The inspection device 40 includes a determination processing unit 42 which determines whether each of the pixels in the color imaging element 20 is a defective pixel or not, and a registration processing unit 45 which registers pixel information 43 and threshold value information 44 which are used in this determination, and the defective pixel information in the defective pixel information data 37.

The pixel information 43 includes address information of each of the pixels in the color imaging element 20, and information concerning the type of the pixel (for instance, sparse G pixel, dense G pixel, R pixel, B pixel and the like), and the like.

The threshold value information 44 stores a threshold value A therein which is used for the determination of whether the sparse G pixel is the sparse G defective pixel or not, and a threshold value B therein which is used for the determination of whether the dense G pixel is the dense G defective pixel or not. When the pixel value (output value) of the pixel to be inspected is the threshold value or larger, the pixel is considered to be a defective pixel having a higher level of a dark output. The threshold value B is set at a value larger than the threshold value A.

Incidentally, the inspection device 40 makes the color imaging element 20 take an image, for instance, under a light-shielded state in which the imaging surface of the color imaging element 20 is light-shielded by the mechanical shutter 16, prior to the determination by the determination processing unit 42. Specifically, the pixel value (output value) of each of the pixels in the color imaging element 20 under the light-shielded state is previously determined. Thus obtained pixel value of each of the pixels represents the level of the dark output of each of the pixels. Here, a method for determining the level of the dark output of each of the pixels is not limited to the above described method, and various known methods can be used.

The determination processing unit 42 determines whether the pixel value of each of the pixels, which has been obtained under the light-shielded state, is the threshold value or larger, or not, and when the pixel value is the threshold value or larger, the determination processing unit 42 determines that the pixel is the defective pixel. At this time, the determination processing unit 42 determines the pixel to be inspected by using "threshold value A" when the pixel to be inspected is the sparse G pixel, and determines the pixel to be inspected by using "threshold value B" when the pixel to be inspected is the dense G pixel, based on the pixel information 43.

Incidentally, the determination processing unit 42 performs the determination processing by using, for instance, "threshold value A" (where value other than threshold value A is also acceptable), when the pixel to be inspected is the R pixel or the B pixel.

The registration processing unit 45 registers the defective pixel information concerning the pixel which has been determined to be the defective pixel by the determination processing unit 42, within a range of the upper limit number of the registration, in the defective pixel information data 37. At this time, there is the case where the total pixel number of the G defective pixels is larger than the upper limit number of the registration of the G defective pixels. In this case, the registration processing unit 45 registers the defective pixel information firstly on the sparse G defective pixel, for instance, in the defective pixel information data 37.

Registration Processing of Defective Pixel Information

Figure 7:
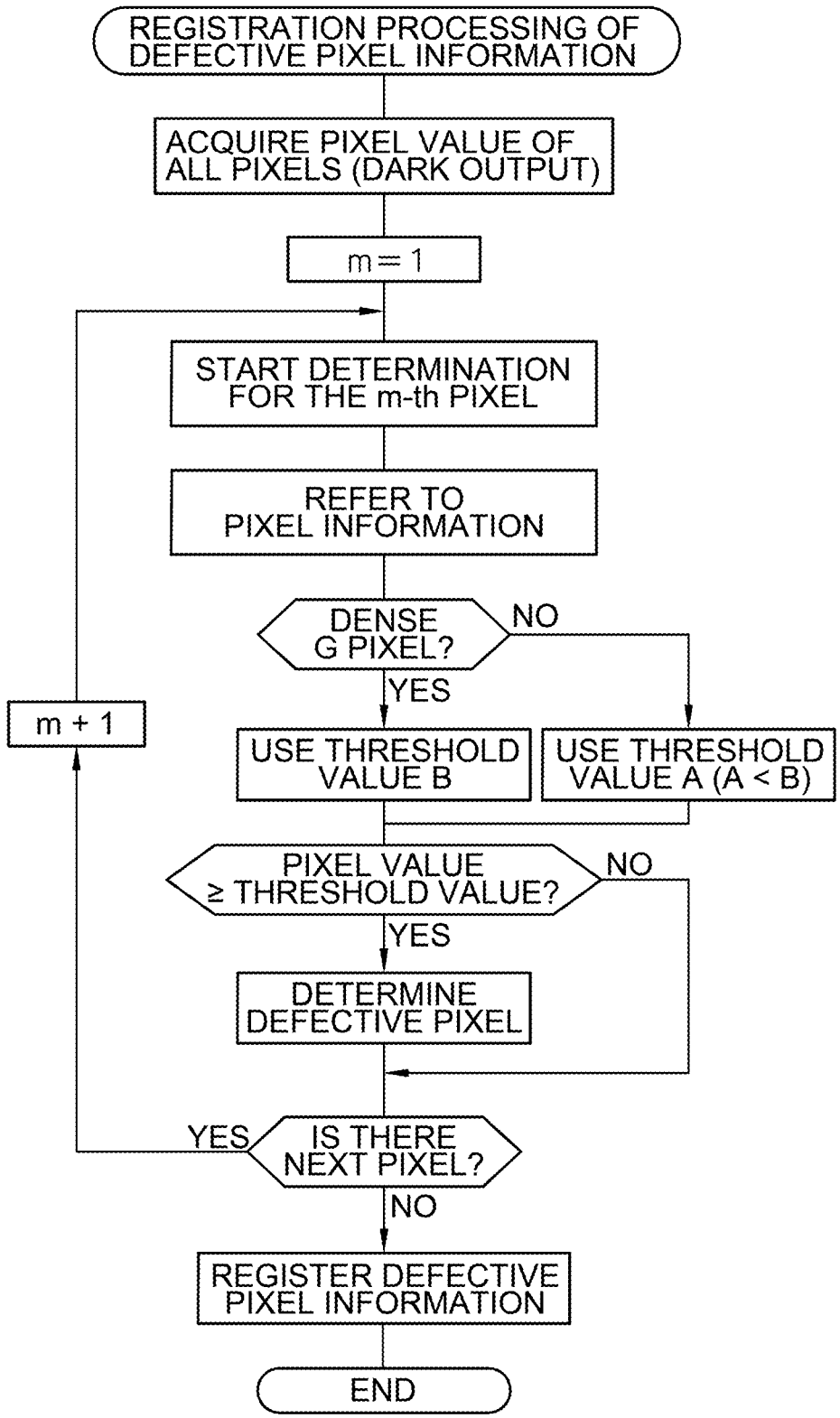
FIG. 7 is a flow chart illustrating a flow of registration processing of defective pixel information to defective pixel information data.

Next, a flow of registration processing of the defective pixel information by the inspection device 40 will be described with reference to FIG. 7. Firstly, an image is taken by the color imaging element 20 in the light-shielded state in which the mechanical shutter 16 is closed, based on a command to take an image, which is sent from the inspection device 40. The output signal which is output from each of the pixels in the color imaging element 20 is input into the inspection device 40 as the pixel value.

Subsequently, the determination processing unit 42 in the inspection device 40 operates. The determination processing unit 42 starts the determination processing for the first (for instance, address (1, a)) pixel. Incidentally, the address of the pixel to be inspected can be discriminated, for instance, from the order of the pixel values output from the color imaging element 20, and the like. The determination processing unit 42 discriminates the type of the pixel with reference to the pixel information 43, based on the address of the pixel to be inspected.

When the first pixel is, for instance, "sparse G pixel", the determination processing unit 42 compares the threshold value A with the pixel value. Then, when pixel value≥threshold value A holds, the determination processing unit 42 determines that the sparse G pixel is the sparse G defective pixel, and when pixel value<threshold value A holds, the determination processing unit 42 determines that the sparse G pixel is a normal pixel.

In addition, when the first pixel is, for instance, "dense G pixel", the determination processing unit 42 compares the sizes of the threshold value B and the pixel value. When pixel value≥threshold value B holds, the determination processing unit 42 determines that the dense G pixel is the dense G defective pixel, and when pixel value<threshold value B holds, the determination processing unit 42 determines that the dense G pixel is a normal pixel. Incidentally, when the type of the first pixel is the R pixel or the B pixel, for instance, the determination processing unit 42 determines whether the pixel is the defective pixel or not by using the threshold value A.

Subsequently, the determination processing unit 42 determines whether the pixel is the defective pixels or not, for the second and subsequent pixels as well, in a similar way to the determination processing for the first pixel. The determination result of the determination processing unit 42 is sequentially input into the registration processing unit 45.

After the determination processing by the determination processing unit 42 has been ended, the registration processing unit 45 registers the defective pixel information concerning each of the defective pixels (sparse G defective pixel, dense G defective pixel, and R and B defective pixels) in the defective pixel information data 37 in the digital camera 10. Incidentally, as has been described above, when the total pixel number of the G defective pixels is larger than the upper limit number of the registration of the G defective pixel, the defective pixel information on the sparse G defective pixel is firstly registered. In the inspection device 40, the threshold values are set so that threshold value A<threshold value B holds, and accordingly even when the pixel value of the sparse G pixel is smaller than the pixel value of the dense G pixel, in other words, even when the level of the dark output is low, the pixel is occasionally determined to be the sparse G defective pixel. Because of this, the sparse G pixel has higher probability of being determined to be the defective pixel than the dense G pixel. As a result, "ratio R2 of registration number of sparse G defective pixels", which is registered in the defective pixel information data 37, becomes larger than "ratio R1 of registration number of dense G defective pixels". Thereby, the defective pixel information on the sparse G defective pixel is more preferentially registered in the defective pixel information data 37 than the defective pixel information on the dense G defective pixel.

Incidentally, in the above described embodiment, after the determination processing for all of the pixels by the determination processing unit 42 has been ended, the defective pixel information is collectively registered in the defective pixel information data 37, but the defective pixel information may be sequentially registered in the defective pixel information data 37. At this time, when the registration number of the G defective pixels which are registered in the defective pixel information data 37 reaches the upper limit number of the registration, new defective pixel information on the sparse G defective pixel, for instance, may be overwritten on the defective pixel information on the dense G defective pixels which have been previously registered in the defective pixel information data 37.

Interpolation Processing of Pixel Value of Defective Pixel

The interpolation processing unit 26 acquires the defective pixel information data 37 from the memory unit 27, and discriminates the address of the defective pixel based on the defective pixel information data 37. Then, based on this discrimination result, the interpolation processing unit 26 subjects the pixel values of each of the defective pixels which are registered in the defective pixel information data 37 to the interpolation processing which uses the pixel values of the peripheral pixels having the same colors.

Figure 8:
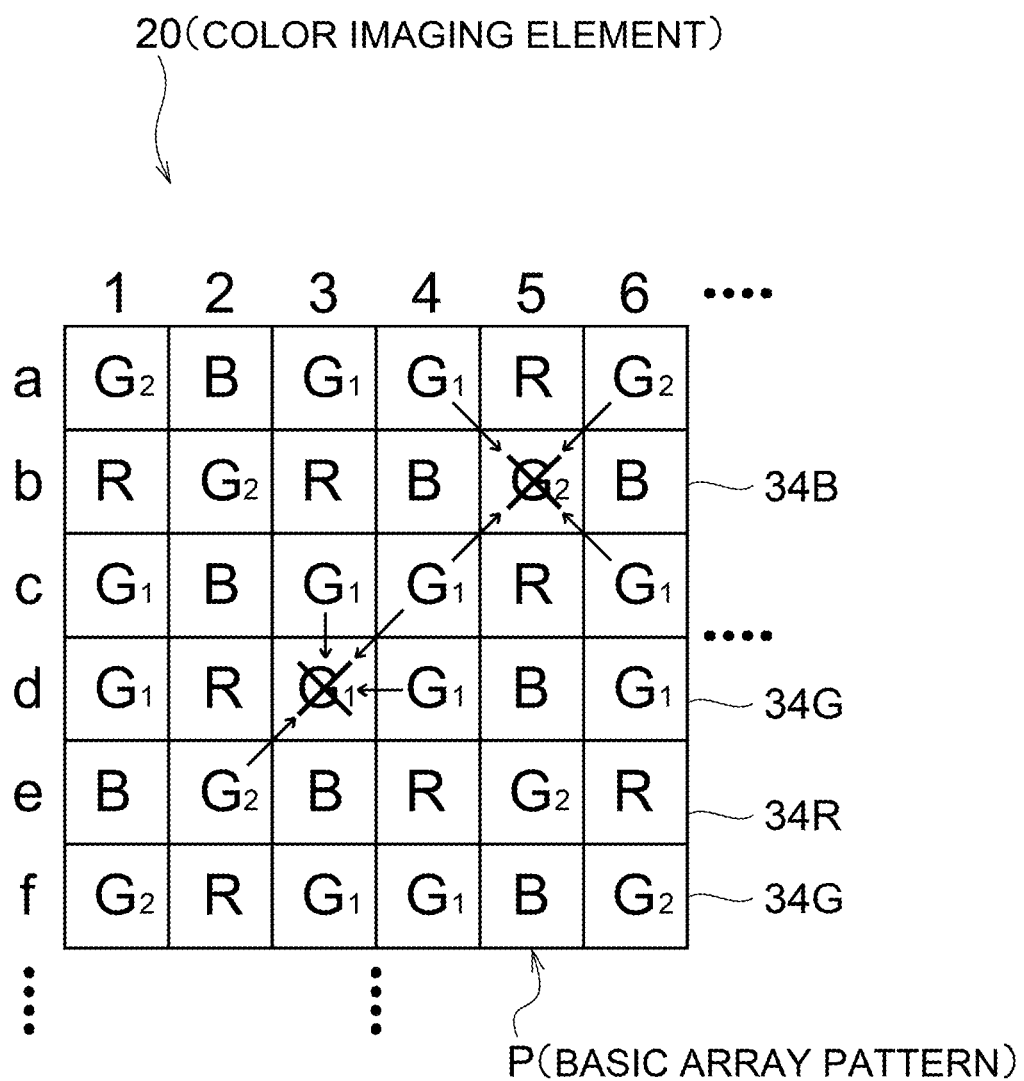
FIG. 8 is an explanatory drawing for describing interpolation processing of pixel values of the sparse G defective pixel and the dense G defective pixel.

As is illustrated in FIG. 8, when the dense G pixel in an address (3, d) is a dense G defective pixel, the interpolation processing unit 26 determines the pixel value of the dense G defective pixel by the interpolation processing that uses the pixel values, for instance, of each of the G pixels in addresses (3, c), (4, c), (4, d) and (2, e), which are adjacent thereto in the horizontal, vertical, and oblique (NE) directions.

In addition, when the sparse G pixel in an address (5, b) is the sparse G defective pixel, the interpolation processing unit 26 determines the pixel value of the sparse G defective pixel by the interpolation processing that uses the pixel values, for instance, of each of the G pixels in addresses (4, a), (4, c), (6, a) and (6, c), which are adjacent in the oblique (NE and NW) directions.

Furthermore, when the R and B pixels are the R and B defective pixels, respectively, the interpolation processing unit 26 performs the interpolation processing by using the pixel values of the pixels of the same colors positioned so as to be adjacent to the R and B pixels. Incidentally, the peripheral pixel which is used for the interpolation processing of each of the defective pixels is not limited to the example illustrated in FIG. 8, and may be appropriately changed. In addition, a method (expression) for calculating the pixel value by the interpolation processing is not limited in particular. For instance, the optimal expression may be used which has been determined by simulation and the like.

Operation of Digital Camera of First Embodiment

Next, an operation of a digital camera 10 having the above described configuration will be described with reference to FIG. 9. When the operation mode of the digital camera 10 is set to a photographing mode of taking a photograph by the operation unit 12, the CPU 11 controls the operation of the mechanical shutter 16 through the lens driver 21 and also drives the color imaging element 20 through the imaging element driver 23.

The mechanical shutter 16 is opened and closed at a predetermined shutter speed, and electric signal charges are accumulated in the RGB pixels in the color imaging element 20. The output signal is output from each of the RGB pixels to the signal conditioning circuit 24 under the control of the imaging element driver 23. The signal conditioning circuit 24 performs various processes such as correlation double sampling processing and gain amplification processing, for the output signal sent from each of the RGB pixels, and then outputs the processed output signal to the image processing circuit 25.

The interpolation processing unit 26 in the image processing circuit 25 operates with predetermined timing when the operation mode of the digital camera 10 is set to the photographing mode and the like, and acquires (sees) the defective pixel information data 37 memorized in the memory unit 27. Based on the defective pixel information data 37, the interpolation processing unit 26 discriminates the address of the defective pixel to be a target of the interpolation processing.

Subsequently, the interpolation processing unit 26 determines the pixel value corresponding to the output signal of the defective pixel by the interpolation processing that uses the pixel values of the peripheral pixels as illustrated in FIG. 8, in the order of the pixels which are registered, for instance, in the defective pixel information data 37. Thereby, the interpolation processing is performed for all of the defective pixels which are registered in the defective pixel information data 37.

At this time, a ratio (second ratio) of the sparse G defective pixel to be interpolated with respect to "total pixel number of sparse G pixels" becomes equal to "ratio R2 of registration number of sparse G defective pixels", which is included in the defective pixel information data 37. In addition, a ratio (first ratio) of the dense G defective pixel to be interpolated with respect to "total pixel number of dense G pixels" becomes equal to "ratio R1 of registration number of dense G defective pixels". Thereby, "ratio R2 of sparse G defective pixel to be interpolated">"ratio R1 of dense G defective pixel to be interpolated" holds. Because of this, in the interpolation processing unit 26, the interpolation processing of the sparse G defective pixel is more preferentially performed than the interpolation processing of the dense G defective pixel.

The interpolation processing unit 26 performs the interpolation processing of the defective pixel, and then performs the interpolation processing of the missing pixel. Incidentally, the interpolation processing of the missing pixel is a well-known technique, and accordingly specific description is omitted. At the same time when the interpolation processing unit 26 performs such interpolation processing, the image processing circuit 25 performs various image processes such as gradation modulation, white balance correction and γ correction processing, and photographed image data are generated.

The photographed image data which have been generated by the image processing circuit 25 are output to the display unit 32 with fixed timing. Thereby, a live-view image is displayed on the display unit 32. In addition, photographing preparation processing such as AF processing and AE processing is also simultaneously performed.

When a photographing instruction is given by the operation unit 12, the image processing circuit 25 generates photographed image data corresponding to one frame. The photographed image data are compressed by the compression expansion processing circuit 29, and then is recorded in the memory card 31 through the media I/F 30.

In the digital camera 10, the interpolation processing of the pixel value of the sparse G defective pixel which exerts a strong influence on the quality of the photographed image data is more preferentially performed than the interpolation processing of the pixel value of the dense G defective pixel. Because of this, even when the interpolation processing cannot be performed for all of the defective pixels, from the viewpoint of the upper limit of the memory capacity of the memory unit 27 and the prevention of the increase in the processing time period concerning the interpolation processing, the influence of the sparse G defective pixel exerting onto the photographed image data can be reduced. As a result, adequate photographed image data are obtained.

Color Imaging Element of Embodiment 1-1

The G pixel (G filter 34G) in the color imaging element 20 of the above described first embodiment includes two types of sparse and dense G pixels (G filter 34G), but may include three types of sparse and dense G pixels (G filter 34G).

Figure 10:
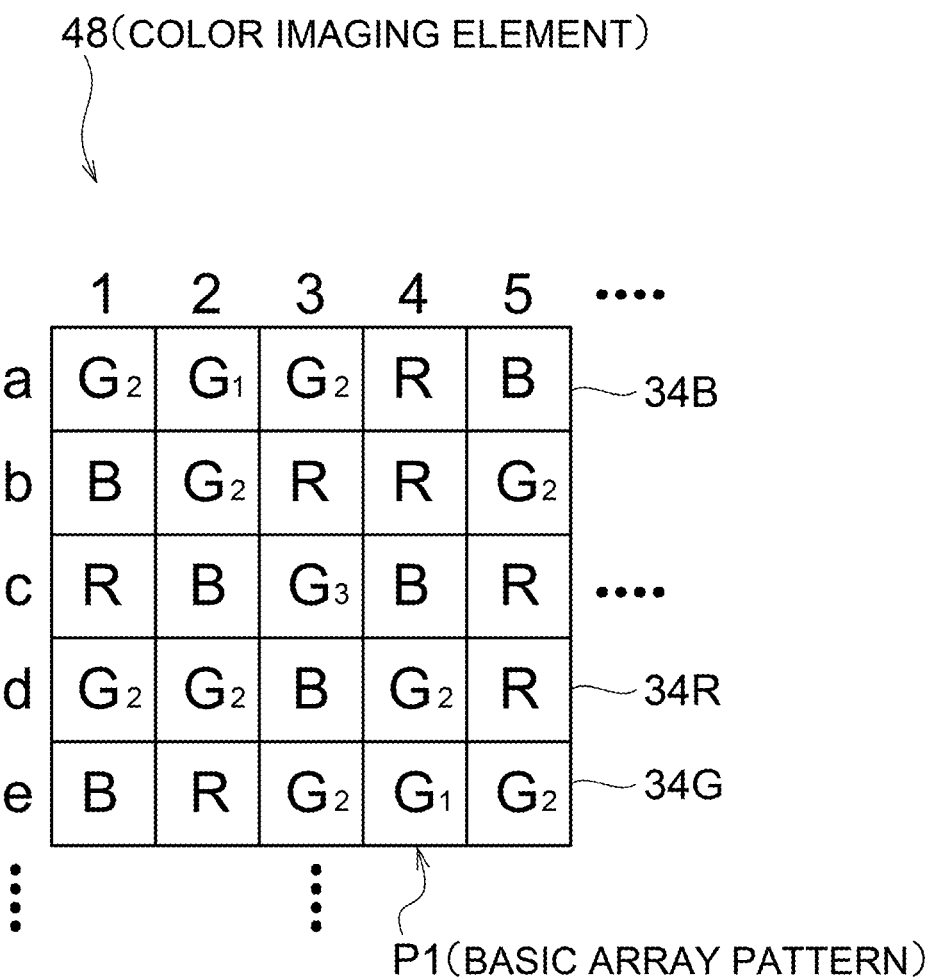
FIG. 10 is a schematic diagram of the color imaging element of Embodiment 1-1.

For instance, the G pixel in the color imaging element 48 illustrated in FIG. 10 includes a $G_1$ pixel to which three pieces of other G pixels are adjacent in the horizontal and vertical directions, a $G_2$ pixel to which one piece of another G pixel is adjacent, and a $G_3$ pixel to which any pixel is not adjacent. In this case, the $G_2$ pixel becomes "sparse G pixel" with respect to the $G_1$ pixel, but becomes "dense G pixel" with respect to the $G_3$ pixel. In addition, the $G_1$ pixel and the $G_3$ pixel become "dense G pixel" and "sparse G pixel" with respect to each of the other G pixels, respectively. Incidentally, the reference character and numeral "P1" in the figure is the basic array pattern which constitutes the color filter array of the color imaging element 48.

When such three types of sparse and dense G pixels are included, the registration of the defective pixel information and the interpolation processing of the defective pixel are performed according to the priority of $G_3$ pixel>$G_2$ pixel>$G_1$ pixel, similarly to the first embodiment.

Figure 11:
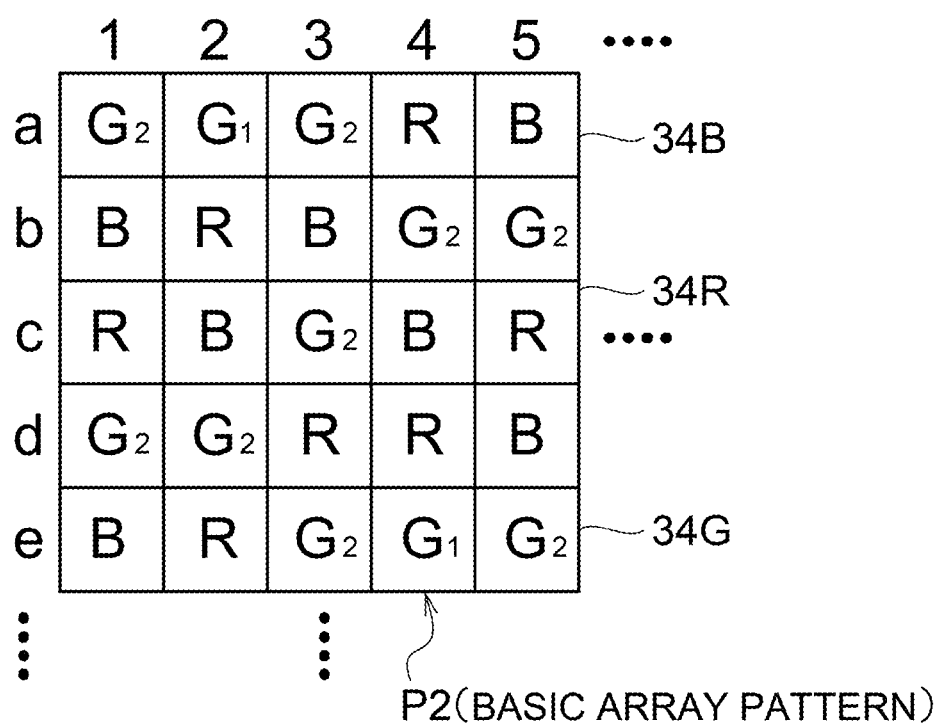
FIG. 11 is a schematic diagram of a color imaging element of another embodiment of the color imaging element illustrated in FIG. 10.

In addition, the color imaging element 49 illustrated in FIG. 11 is basically the same as the color imaging element 48 illustrated in FIG. 10, except that two pieces of the G pixels are adjacent only in the horizontal direction (where vertical direction is also acceptable) of the $G_1$ pixel. Incidentally, the reference character and numeral "P2" in the figure is the basic array pattern which constitutes the color filter array of the color imaging element 49.

Thus, in the presently disclosed subject matter, the G pixel having a relatively small number of the G pixels adjacent in the horizontal and vertical directions is determined to be "sparse G pixel", and is more preferentially subjected to the registration of the defective pixel information and the interpolation processing of the defective pixel than "dense G pixel" having a larger number of the G pixels. In the embodiment illustrated in FIG. 10 and FIG. 11, the case has been described where the G pixel includes three types of sparse and dense G pixels (G filter 34G), but the presently disclosed subject matter can be applied also to the case where the G pixel includes four types or more of sparse and dense G pixels (G filter 34G).

Color Imaging Element of Embodiment 1-2

In the color imaging element 20 of the above described first embodiment, the G pixel having a smaller number of the G pixels adjacent in the horizontal and vertical directions is determined to be "sparse G pixel", and the G pixel having a larger number of the G pixels is determined to be "dense G pixel", but even when the number of the G pixels adjacent in the horizontal and vertical directions are the same, there is the case where the sparse and dense G pixels are formed.

Figure 12:
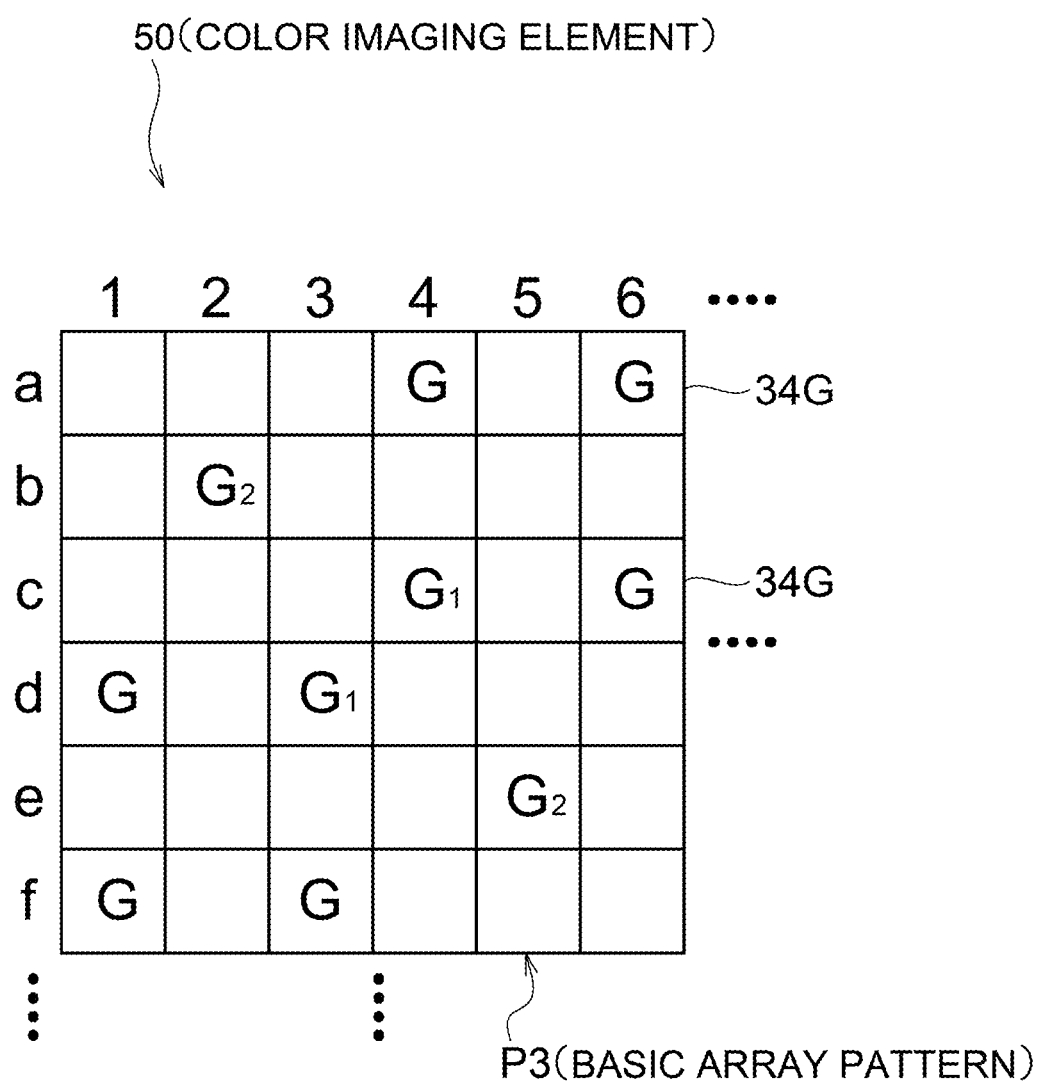
FIG. 12 is a schematic diagram of the color imaging element of Embodiment 1-2.

For instance, the G pixel in the color imaging element 50 illustrated in FIG. 12 includes a $G_1$ pixel and a $G_2$ pixel which are different from those in each of the above described embodiments. Incidentally, in the figure, the illustration of the R and B pixels (R and B filters 34R and 34B) is omitted. In addition, the reference character and numeral "P3" in the figure is the basic array pattern which constitutes the color filter array of the color imaging element 50.

Other G pixels are not arranged so as to be adjacent thereto in the horizontal and vertical directions of the $G_1$ pixel, but one piece of another G pixel is adjacent thereto in an oblique (NE) direction. On the other hand, even one piece of another G pixel is not adjacent in each direction of the horizontal, vertical and oblique (NE and NW) directions of the $G_2$ pixel.

The pixel value of the missing G pixel which is calculated from the interpolation processing is also affected by the G pixel adjacent in the oblique (NE and NW) directions, though being less affected by the G pixel adjacent in the horizontal and vertical directions. Because of this, it can be said that the influence having when the $G_2$ pixel is the defective pixel tends to more easily spread than the influence having when the $G_1$ pixel is the defective pixel, and exerts more influence on the photographed image data. Accordingly, even though the number of the G pixels adjacent in the horizontal and vertical directions is equally the M pieces ($0 \leq M \leq 4$), the $G_2$ pixel having a relatively small number of the G pixels (G filter 34G) which are adjacent in the oblique (NE and NW) directions is determined to be "sparse G pixel", and the $G_1$ pixel having a relatively large number of the G pixels is determined to be "dense G pixel". The registration and the interpolation processing of the sparse G defective pixel are preferentially performed similarly to each of the above described embodiments.

In the color imaging element 50 illustrated in FIG. 12, the number of other G pixels adjacent in the horizontal and vertical directions of the sparse G pixel and the dense G pixel is 0, but even though the number is 1 or more, the G pixel can be similarly determined to be the sparse and dense G pixels.

Color Imaging Element of Embodiment 1-3

In the above described first embodiment, the case has been described where the G pixel (G filter 34G) includes "sparse G pixel (sparse G filter 34G)" and "dense G pixel (dense G filter 34G)", but the presently disclosed subject matter is not limited to the case. As in the color imaging element 52 illustrated in FIG. 13, for instance, the R pixel (R filter 34R) may include "sparse R pixel (sparse R filter 34R which is represented by "$R_2$" in the figure)" and "dense R pixel (dense R filter 34R which is represented by "$R_1$" in the figure)". In this case as well, the registration and the interpolation processing of the sparse R defective pixel are preferentially performed similarly to the first embodiment. Incidentally, the reference character and numeral "P4" in the figure is the basic array pattern which constitutes the color filter array of the color imaging element 52.

Figure 13:
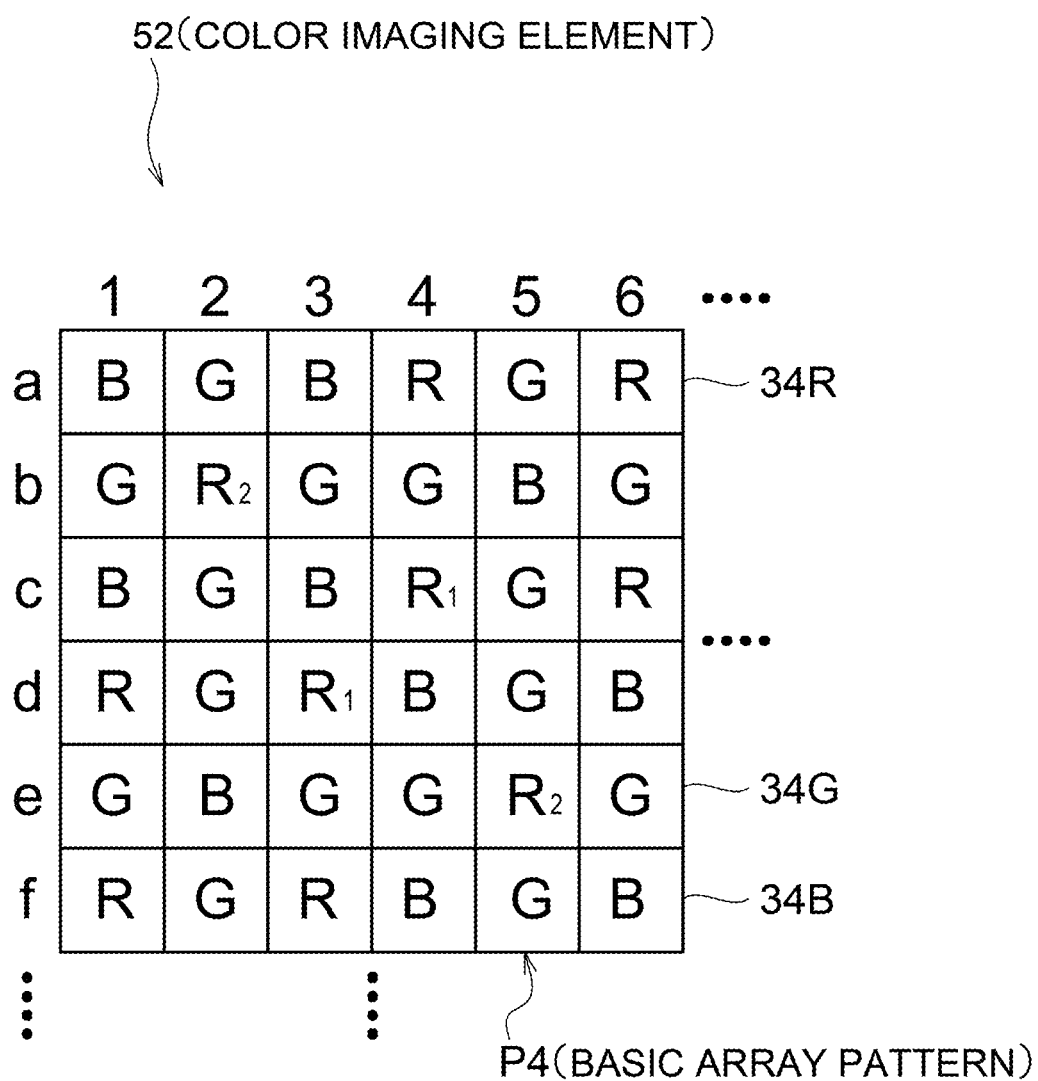
FIG. 13 is a schematic diagram of the color imaging element of Embodiment 1-3.

For information, in the embodiment illustrated in FIG. 13, there is no difference in the number of the other R pixels adjacent in the horizontal and vertical directions between the sparse and dense R pixels, but the number of the other R pixels adjacent in the horizontal and vertical directions may be different similarly to the G pixel in the first embodiment.

In addition, in the embodiment illustrated in FIG. 13, the sparse-dense R pixels (R filter 34R) have been described, but the presently disclosed subject matter can be similarly applied also to the case where the B pixel (B filter 34B) includes the sparse-dense B pixels (B filter 34B).

Whole Configuration of Digital Camera of Second Embodiment

Next, a digital camera 55 of a second embodiment of the presently disclosed subject matter will be described with reference to FIG. 14. The digital camera 10 of the above described first embodiment registers the defective pixel information on each of the defective pixels (sparse G defective pixel, dense G defective pixel and R/B defective pixel) in the defective pixel information data 37, and subjects the defective pixels to the interpolation processing. On the other hand, the digital camera 55 registers the defective information on continuous defective pixels in which each of the defective pixels is adjacent or close to each other, and subjects the continuous defective pixels to the interpolation processing.

The digital camera 55 basically has the same configuration as that in the first embodiment, except that defective pixel information data 57 which is different from that in the first embodiment is stored in the memory unit 27. For this reason, units having the same function and configuration as those in the above described first embodiment are designated by the same reference characters and numerals, and the description is omitted. Incidentally, in each of the second and subsequent embodiments, the case will be described where the defect occurs only in the G pixel, in order to prevent complication of the description.

The defective pixel information data 57 includes the defective pixel information on sparse-dense G continuous defective pixels (first continuous defective pixels), sparse-sparse G continuous defective pixels (second continuous defective pixels), and dense-dense G continuous defective pixels (third continuous defective pixels), as the G defective pixel, in addition to the defective pixel information on the previously described sparse G defective pixel and dense G defective pixel.

As is illustrated in FIG. 15, the sparse-dense G continuous defective pixels are continuous defective pixels in which the sparse G defective pixel and the dense G defective pixel are adjacent to each other in any direction (in the figure, in NE direction) of each direction of the horizontal, vertical and oblique (NE and NW) directions. Incidentally, pixels in which the sparse G pixel and the dense G pixel are adjacent to each other in any of each direction are referred to as "sparse-dense G pixels" (first continuous pixels), regardless of the presence or absence of the defect.

Figure 16:
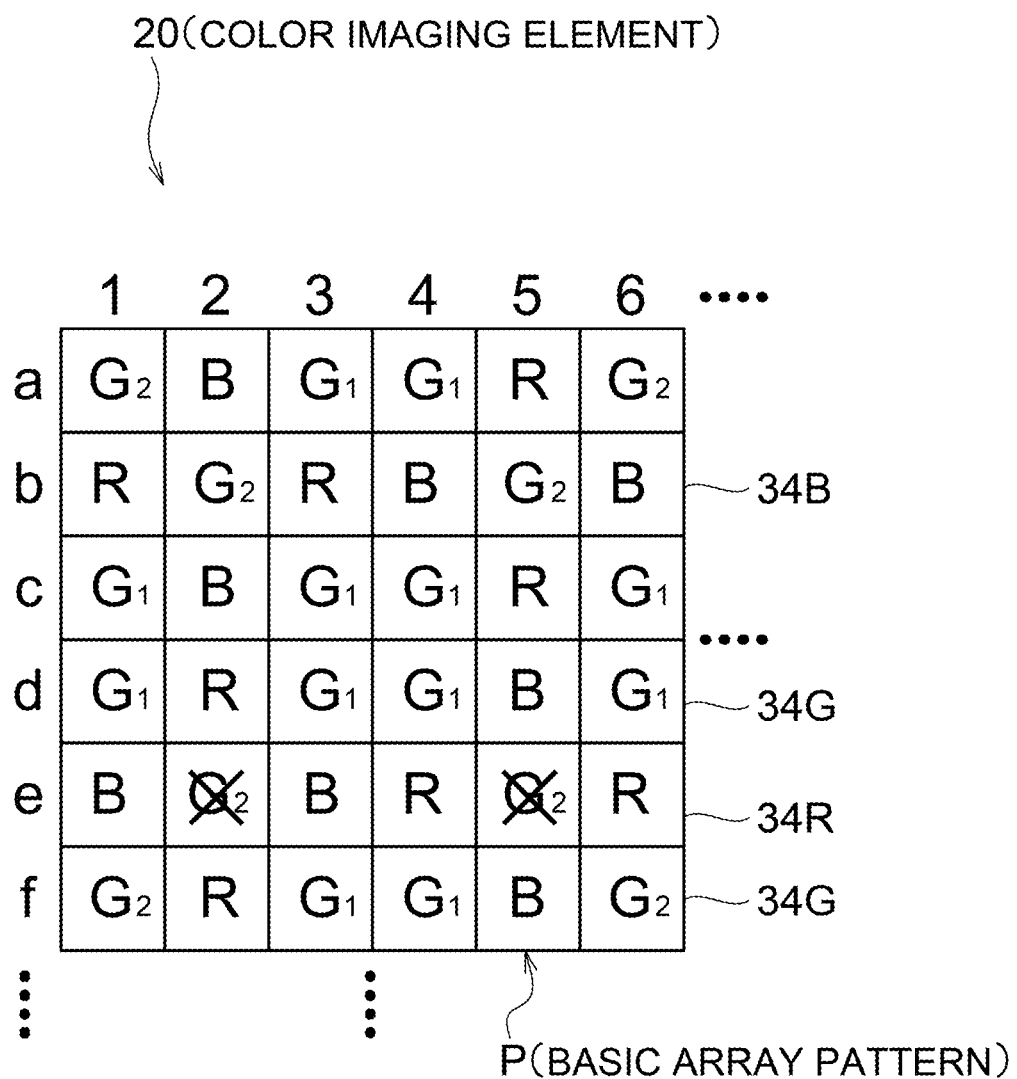
FIG. 16 is an explanatory drawing for describing sparse-sparse G defective pixels.

As is illustrated in FIG. 16, the sparse-sparse G continuous defective pixels are continuous defective pixels in which the two sparse G defective pixels are close to each other in any (in the figure, in horizontal direction) of each direction of the horizontal, vertical and oblique (NE and NW) directions. "Close" described here means that the pixels are in positions at which the pixels are not adjacent but are close to each other (for instance, within several pixel pitches or less). Incidentally, G pixels in which the two sparse G pixels are close to each other in any of each direction are referred to as "sparse-sparse G pixel" (second continuous pixels), regardless of the presence or absence of the defect.

Figure 17:
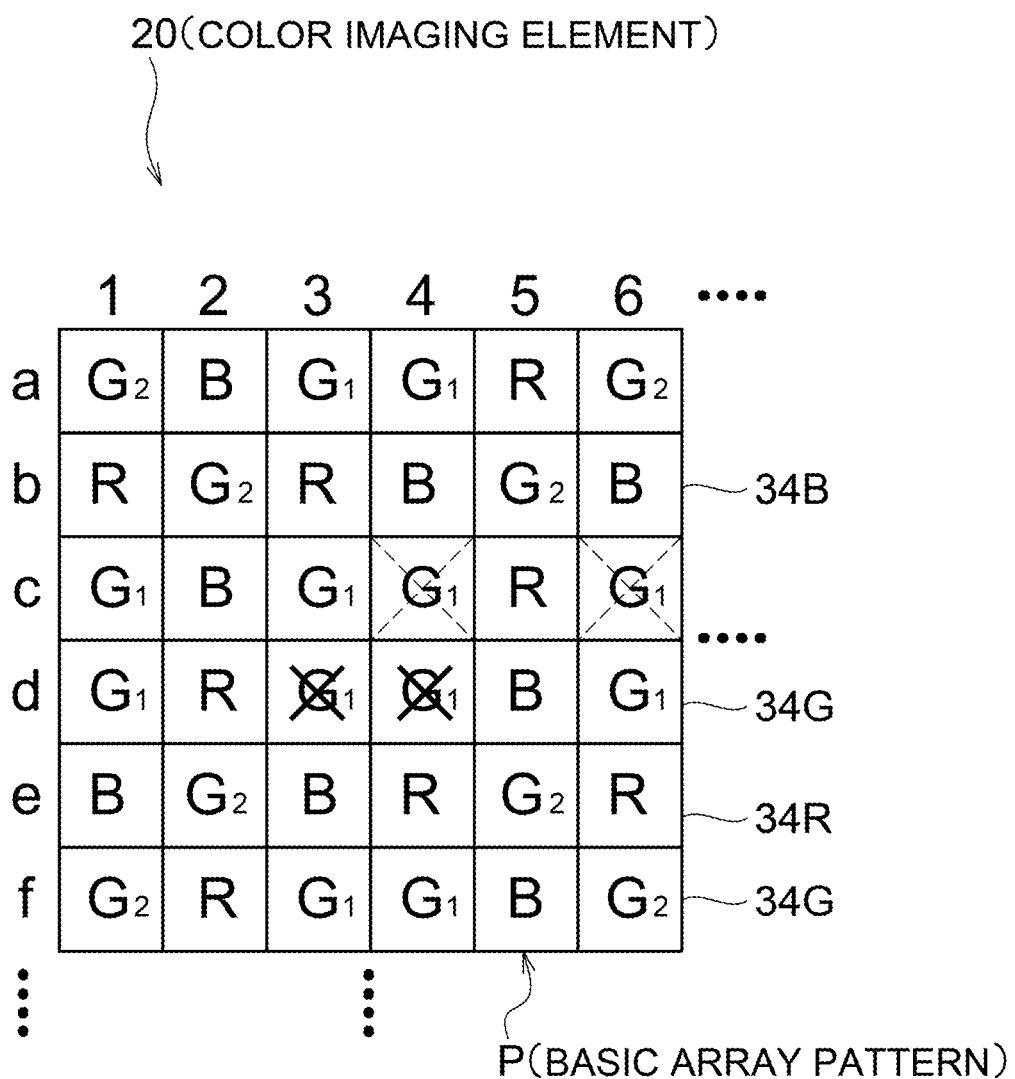
FIG. 17 is an explanatory drawing for describing dense-dense G defective pixels.

As is illustrated in FIG. 17, the dense-dense G continuous defective pixels are continuous defective pixels in which the two dense G defective pixels are adjacent to each other in any (in the figure, in horizontal direction) of each direction of the horizontal, vertical and oblique (NE and NW) directions. Incidentally, G pixels in which the two dense G pixels are adjacent to each other in any of each direction are referred to as "dense-dense G pixel" (third continuous pixels), regardless of the presence or absence of the defect. In addition, the dense-dense G continuous defective pixels may include continuous defective pixels (which are illustrated by x mark of dotted line) in which the two dense G defective pixels are close to each other in any of each direction.

Figure 14:
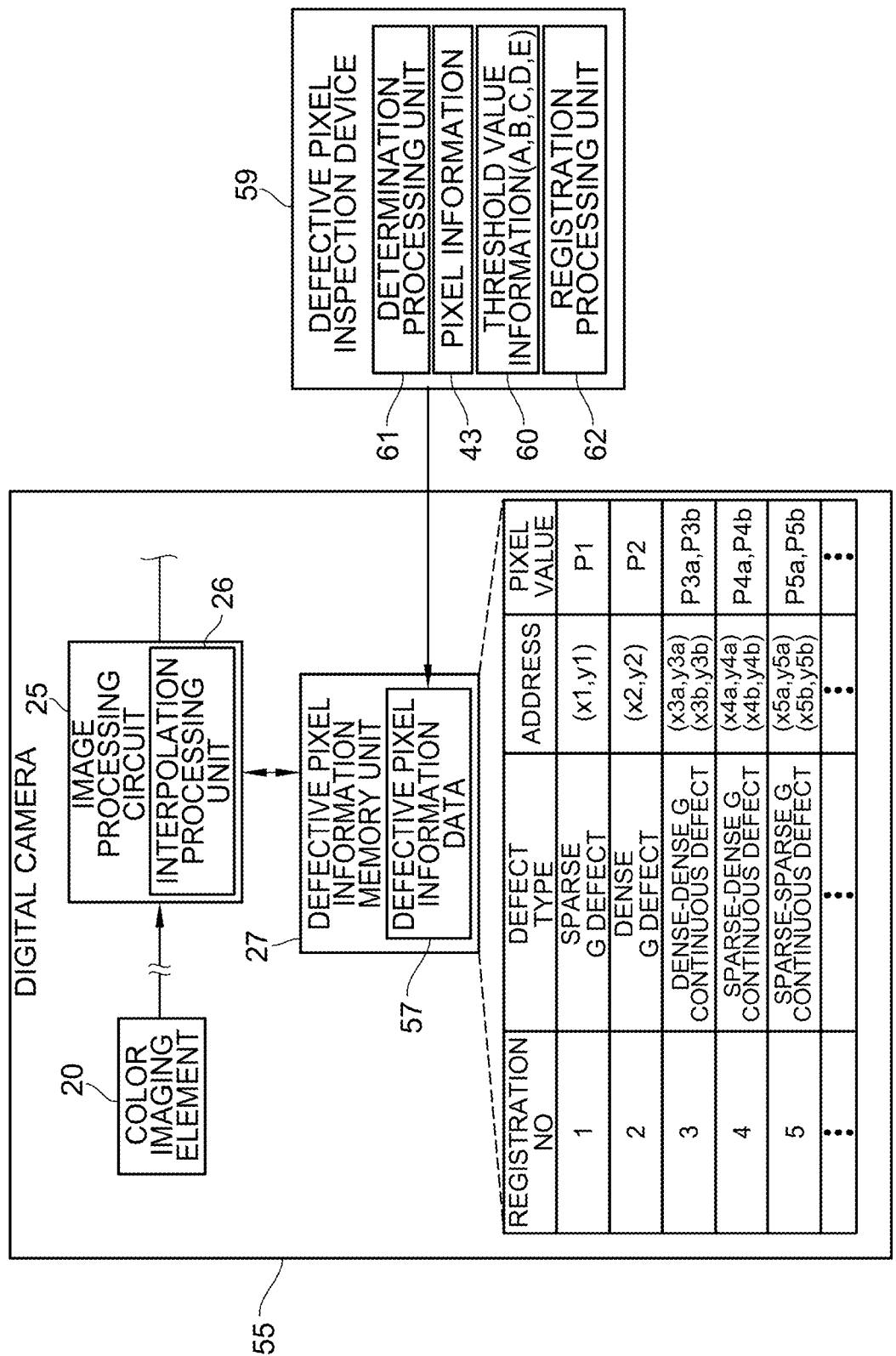
FIG. 14 is a block diagram illustrating an electric configuration of a digital camera of a second embodiment.

The description returns to FIG. 14. The defective pixel information on each of the defective pixels is registered in the defective pixel information data 57, with the use of an inspection device 59. The inspection device 59 more preferentially registers the defective pixel information on each of the G continuous defective pixels than the defective pixel information on the sparse G defective pixel. In addition, the inspection device 59 preferentially registers the defective pixel information in the defective pixel information data 57, in the order of sparse-sparse G continuous defective pixels>sparse-dense G continuous defective pixels>dense-dense G continuous defective pixels.

The "preferential" registration described here means that when a ratio of "registration number of sparse-dense G continuous defective pixels" with respect to "total number of sparse-dense G pixels" is represented by R3, a ratio of "registration number of sparse-sparse G continuous defective pixels" with respect to "total number of sparse-sparse G pixels" is represented by R4, and a ratio of "registration number of dense-dense G continuous defective pixels" with respect to "total number of dense-dense G pixels" is represented by R5, the defective pixels are registered so as to satisfy R4>R3>R5>R2>R1.

The influence of each of the G continuous defective pixels tends to more easily spread than that of the sparse G defective pixel because two defective pixels are adjacent or close to each other, and accordingly the influence on the photographed image becomes larger. Accordingly, the defective pixel information on each of the G continuous defective pixels is more preferentially registered than the defective information on the sparse G defective pixel. In particular, in the case of the sparse-sparse G continuous defective pixels, the sparse G defective pixels are not adjacent to each other, but the sparse-sparse G continuous defective pixels have a possibility of being recognized as one large linear defect if the defective pixels are not subjected to the interpolation processing. The reason is also because in the case of the sparse-dense G continuous defective pixels, one defective pixel is the dense G defective pixel but the interpolation processing of the other sparse G defective pixel is performed by using the pixel value of the dense G defective pixel which has been subjected to the interpolation processing.

The inspection device 59 includes threshold value information 60, a determination processing unit 61, and a registration processing unit 62, which are different from the inspection device 40 in the first embodiment, in addition to the previously described pixel information 43.

The threshold value information 60 stores a threshold value. C therein which is used for the determination of whether the sparse-dense G pixels are the sparse-dense G continuous defective pixels or not, a threshold value D therein which is used for the determination of whether the sparse-sparse G pixels are the sparse-sparse G continuous defective pixels or not, and a threshold value E therein which is used for the determination of whether the dense-dense G pixels are the dense-dense G continuous defective pixels or not, in addition to the previously described threshold values A and B. Each of the threshold values is set so that threshold value D<threshold value C<threshold value E<threshold value A<threshold value B holds, in order that the threshold value becomes smaller as the priority becomes higher, based on the previously described registration priority.

The determination processing unit 61 determines whether each of the pixels is the defective pixel or not, based on the pixel value of each of the pixels, which has been obtained under the light-shielding state, and the threshold values A to E, in a similar way to the previously described first embodiment, and when the pixel is the defective pixel, determines the type of the defective pixel. The defective pixel determining processing by the determination processing unit 61 will be specifically described below.

Defective Pixel Determining Processing in Second Embodiment

Figure 18:
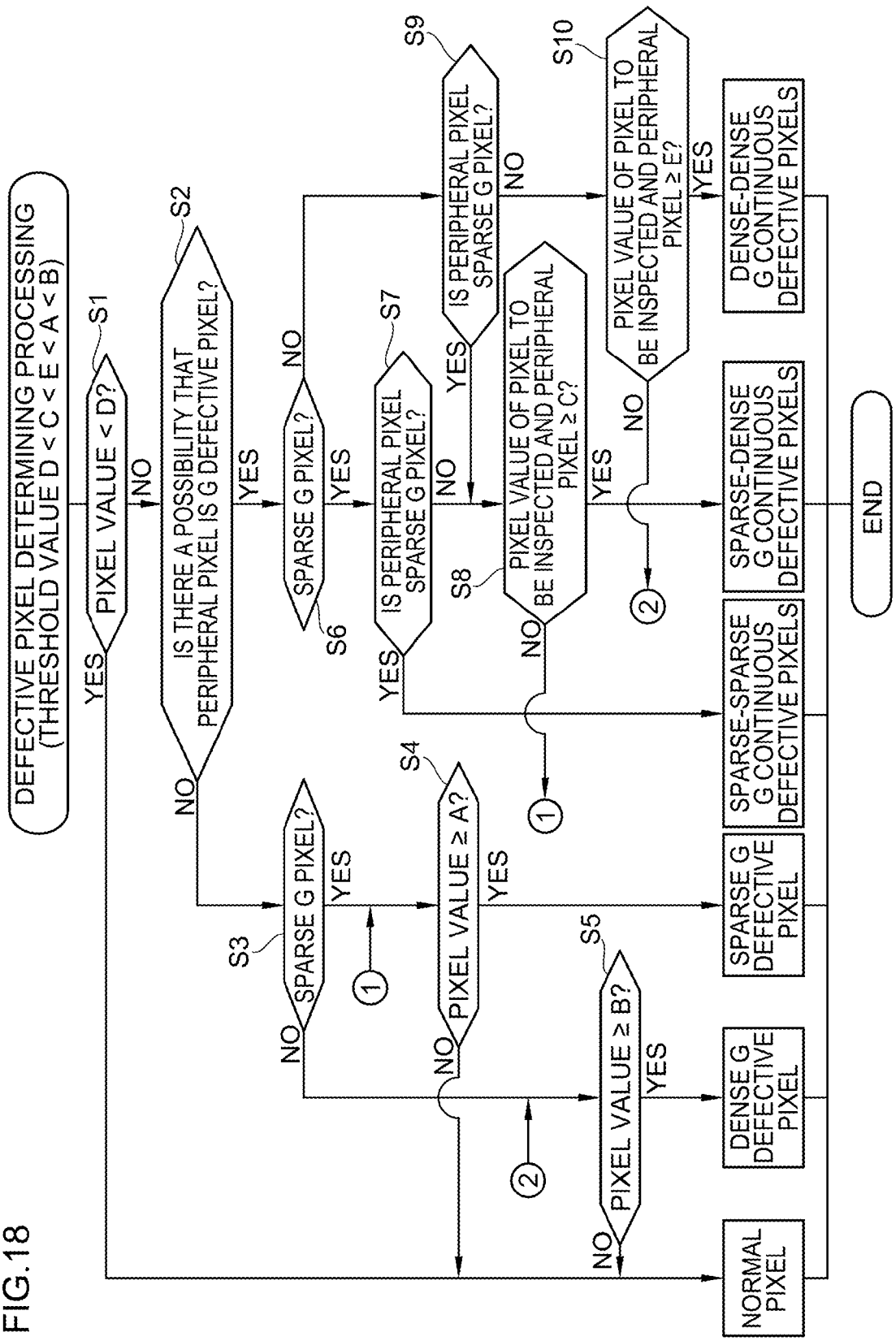
FIG. 18 is a flowchart illustrating a flow of determination processing for a defective pixel of the second embodiment.

As is illustrated in FIG. 18, the determination processing unit 61 firstly determines whether the pixel value of the G pixel to be inspected (hereinafter referred to simply as pixel to be inspected) is less than the smallest threshold value D out of the threshold values A to E, or not (S1). In addition, when the pixel value is less than the threshold value D, the determination processing unit 61 determines that the pixel to be inspected is a normal pixel.

On the other hand, when the pixel value of the pixel to be inspected has been the threshold value D or more in the determination S1, the determination processing unit 61 determines whether a G pixel (hereinafter referred to as peripheral pixel) in the periphery (in adjacent or close position) of the pixel to be inspected has a possibility of being the G defective pixel, or not, based on the pixel information 43 (S2). Specifically, the determination processing unit 61 determines whether the pixel value of the peripheral pixel is the threshold value D or more, or not.

When there is not a possibility that the peripheral pixel is the G defective pixel in the determination S2, the determination processing unit 61 determines whether the pixel to be inspected is the sparse G pixel or not, based on the pixel information 43 (S3). Then, in the case where the pixel to be inspected is the sparse G pixel, if the pixel value of this pixel to be inspected is the threshold value A or more, the determination processing unit 61 determines that the pixel to be inspected is the sparse G defective pixel; and on the contrary, if the pixel to be inspected is less than the threshold value A, the determination processing unit 61 determines that the pixel to be inspected is a normal pixel (S4).

In addition, in the case where the determination processing unit 61 has determined that the pixel to be inspected is the dense G pixel in the determination S3, if the pixel value of this pixel to be inspected is the threshold value B or more, the determination processing unit 61 determines that the pixel to be inspected is the dense G defective pixel; and on the other hand, if the pixel to be inspected is less than the threshold value B, the determination processing unit 61 determines that the pixel to be inspected is the normal pixel (S5).

The description returns to determination S2. When there is a possibility that the peripheral pixel is the G defective pixel (pixel value≥threshold value D), the determination processing unit 61 determines whether the pixel to be inspected (threshold value D or more: determination S1) is the sparse G pixel or not, based on the pixel information 43 (S6).

When the pixel to be inspected (threshold value D or more) is the sparse G pixel in the determination S6, the determination processing unit 61 determines whether the peripheral pixel (threshold value D or more: determination S2) is the sparse G pixel or not, based on the pixel information 43 (S7). When the peripheral pixel (threshold value D or more) is the sparse G pixel, both the pixel to be inspected and the peripheral pixel are the sparse G pixels, and the pixel values of both the pixels become the threshold value D or more. Because of this, the determination processing unit 61 determines that the pixel to be inspected and the peripheral pixel are the sparse-sparse G continuous defective pixels.

On the contrary, when having determined that the peripheral pixel (threshold value D or more) is the dense G pixel in the determination S7, the determination processing unit 61 determines whether both the pixel values of the pixel to be inspected (sparse G pixel and threshold value D or more) and the peripheral pixel (dense G pixel and threshold value D or more) become the threshold value C or more, or not (S8).

When the pixel values of the pixel to be inspected and the peripheral pixel are both the threshold value C or more in the determination S8, the determination processing unit 61 determines that the pixel to be inspected and the peripheral pixel are the sparse-dense G continuous defective pixels. In addition, when one of both the pixel values is less than the threshold value C, the procedure progresses to the previously described determination S4, and the determination processing unit 61 determines whether the pixel to be inspected (sparse G pixel and threshold value D or more) is the sparse G defective pixel or not.

The description returns to the determination S6. When the pixel to be inspected (threshold value D or more) is the dense G pixel, the determination processing unit 61 determines whether the peripheral pixel (threshold value D or more) is the sparse G pixel or not, based on the pixel information 43 (S9). In addition, when the peripheral pixel (threshold value D or more) is the sparse G pixel, the procedure progresses to the previously described determination S8.

In addition, when having determined that the peripheral pixel (threshold value D or more) is the dense G pixel in the determination S9, the determination processing unit 61 determines whether both the pixel values of the pixel to be inspected (dense G pixel and threshold value D or more) and the peripheral pixel (dense G pixel and threshold value D or more) are the threshold value E or more, or not (S10).

When both the pixel values of the pixel to be inspected and the peripheral pixel are the threshold value E or more, the determination processing unit 61 determines that the pixel to be inspected and the peripheral pixel are the dense-dense G continuous defective pixels. In addition, when one of the pixel values of both the pixels is less than the threshold value E, the procedure progresses to the previously described determination S5, and the determination processing unit 61 determines whether the pixel to be inspected (dense G pixel and threshold value D or more) is the dense G defective pixel or not. By the above described steps, the defective pixel determining processing by the determination processing unit 61 is wholly completed.

The description returns to FIG. 14. A registration processing unit 62 is basically the same as the registration processing unit 45 in the first embodiment, and the defective pixel information on the defective pixel which has been determined by the determination processing unit 61 is registered in the defective pixel information data 57 within a range of the upper limit number of the registration. However, the registration processing unit 62 registers the defective pixel information so as to satisfy "ratio R4 of registration number of sparse-sparse G continuous defective pixels">"ratio R3 of registration number of sparse-dense G continuous defective pixels">"ratio R5 of registration number of dense-dense G continuous defective pixels">"ratio R2 of registration number of sparse G defective pixels">"ratio R1 of registration number of dense G defective pixels".

Registration Processing of Defective Pixel Information in Second Embodiment

Figure 19:
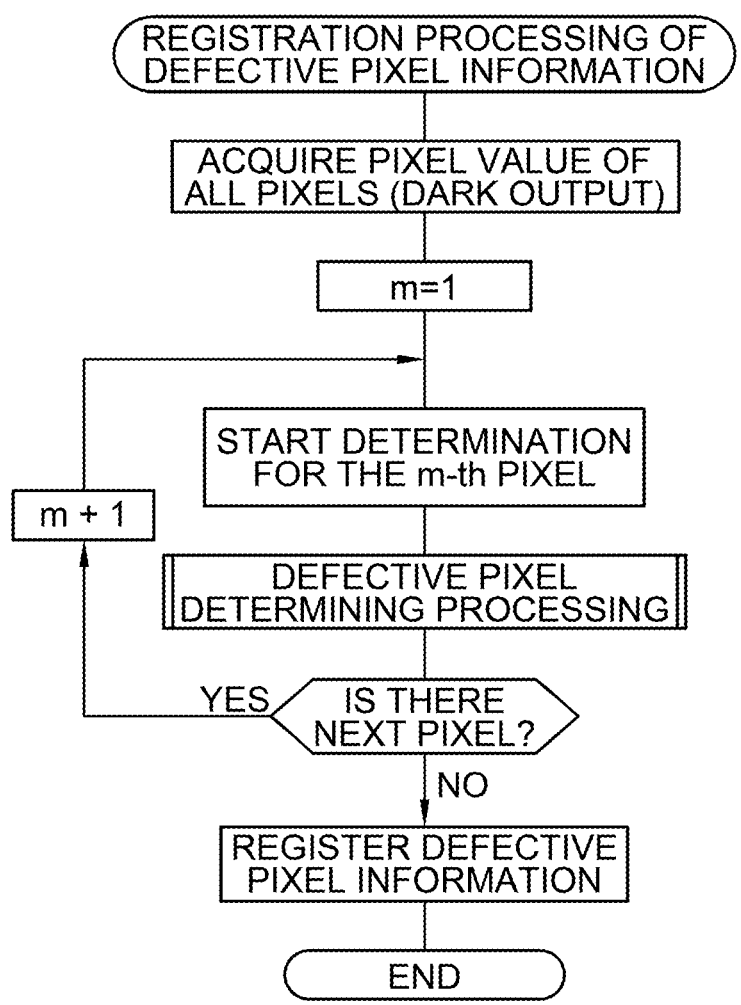
FIG. 19 is a flowchart illustrating a flow of registration processing of defective pixel information of the second embodiment.

As is illustrated in FIG. 19, the registration processing of the defective pixel information by the inspection device 59 is basically the same as the registration processing of the defective pixel information in the first embodiment, except that the defective pixel determining processing illustrated in FIG. 18 is performed, and accordingly the specific description is omitted. According to this registration processing, the defective pixel information is registered in the priority of sparse-sparse G continuous defective pixels>sparse-dense G continuous defective pixels>dense-dense G continuous defective pixels>sparse G defective pixel>dense G defective pixel.

The defective pixel information may be sequentially registered in the defective pixel information data 57, instead of the collective registration of registering each of the defective pixel information collectively in the defective pixel information data 57. At this time, when the registration number of the defective pixels has reached the upper limit number of the registration before the determination processing for all of the pixels is completed, the defective pixel information on the defective pixels having the relatively higher priority may be overwritten on the defective pixel information on the defective pixels having the relatively lower priority, which have been previously registered.

Interpolation Processing of Pixel Value of Defective Pixel

The description returns to FIG. 14. The interpolation processing unit 26 acquires the defective pixel information data 57 from the memory unit 27, and performs the interpolation processing of each of the defective pixels, in a similar way to the first embodiment. Incidentally, when the defective pixel is the sparse-dense G continuous defective pixel, the pixel values of the dense G defective pixel and the sparse G defective pixel are determined by the interpolation processing, as is illustrated by the arrow in FIG. 15. Specifically, the pixel value of the dense G defective pixel is determined by the interpolation processing which uses the pixel values of the three G pixels that are adjacent thereto in the horizontal, vertical and oblique directions (in the figure, upper, right, obliquely upper-right directions). In addition, the pixel value of the sparse G defective pixel is determined by the interpolation processing which uses the pixel values of the three G pixels that are adjacent in the oblique directions (in the figure, obliquely upper-left, obliquely lower-left, and obliquely lower-right directions).

A ratio of the sparse-dense G continuous defective pixels to be interpolated with respect to the total number of the sparse-dense G pixels becomes equal to the previously described ratio R3 (third ratio). In addition, a ratio of the sparse-sparse G continuous defective pixels to be interpolated with respect to the total number of the sparse-sparse G pixels becomes equal to the previously described ratio R4 (fourth ratio). Furthermore, a ratio of the dense-dense G continuous defective pixels to be interpolated with respect to the total number of the dense-dense G pixels becomes equal to the previously described ratio R5 (fifth ratio). Incidentally, the ratios of the sparse G defective pixels to be interpolated and the dense G defective pixels to be interpolated correspond to the previously described ratio R2 and ratio R1, respectively.

Figure 9:
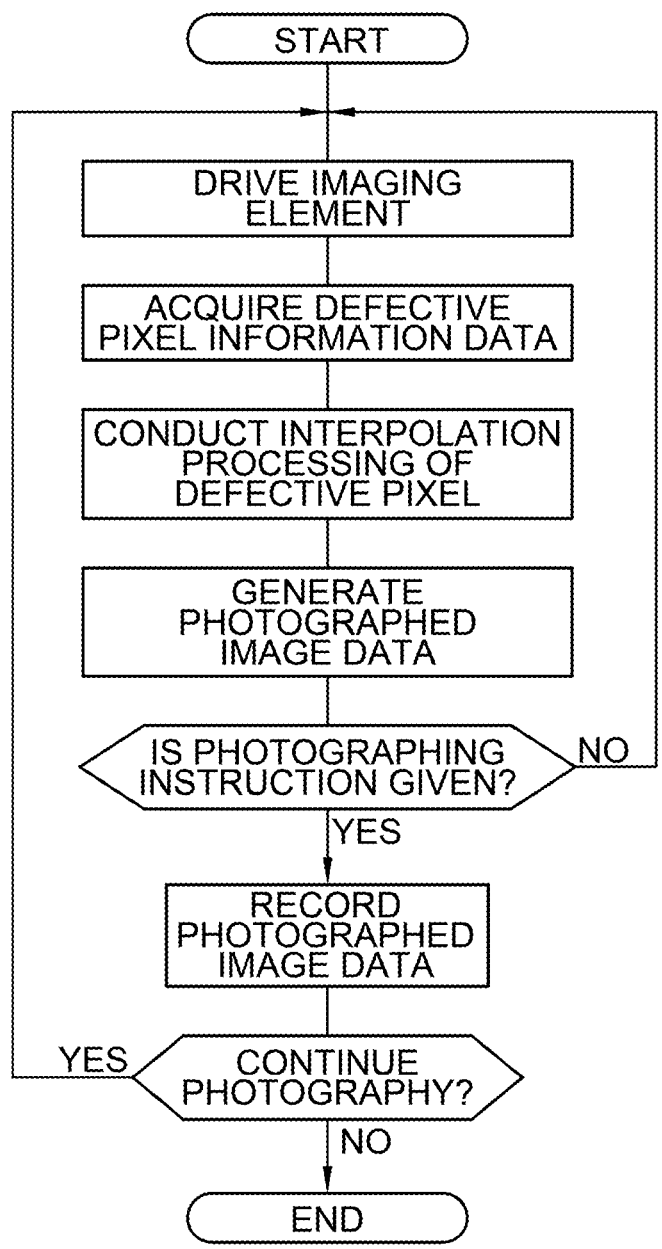
FIG. 9 is a flowchart for describing an operation of the digital camera of the first embodiment.

Incidentally, the operation of the digital camera 55 in the second embodiment is basically the same as that in the first embodiment illustrated in FIG. 9, and accordingly the description is omitted here. In the digital camera 55 as well, the previously described interpolation processing of the defective pixels having the relatively higher priority is more preferentially performed than the interpolation processing of the defective pixels having the relatively lower priority, and accordingly the adequate photographed image data are obtained.

Whole Configuration of Digital Camera of Third Embodiment

Next, a digital camera 65 of a third embodiment of the presently disclosed subject matter will be described with reference to FIG. 20. The above described digital cameras 10 and 55 of the first and second embodiments perform the pixel interpolation processing, by using the common defective pixel information data 37 and 57, regardless of the height of a photographic gain (for instance, ISO sensitivity) of the color imaging element 20, but the digital camera 65 performs the pixel interpolation processing by using different defective pixel information data according to the height of the photographic gain.

The digital camera 65 has basically the same configuration as that in the second embodiment, except that three types of first, second and third defective pixel information data 57a, 57b and 57c are stored in the memory unit 27. For this reason, units having the same function and configuration as those in the above described second (first) embodiment are designated by the same reference characters and numerals, and the description is omitted.

In the first defective pixel information data 57a, the defective pixel information on the defective pixel is registered, which is set when the photographic gain is set, for instance, at ISO 100 or more and less than ISO 800. In the second defective pixel information data 57b, the defective pixel information on the defective pixel is registered, which is set when the photographic gain is set, for instance, at ISO 800 or more and less than ISO 6400. In the third defective pixel information data 57c, the defective pixel information on the defective pixel is registered, which is set when the photographic gain is set, for instance, at ISO 6400 or more. This is because as the photographic gain is higher, the dark output of each of the pixels increases, and consequently there are pixels which do not almost exert an influence on the quality of the photographed image data when the photographic gain is low, but exert an influence on the quality of the photographed image data when the photographic gain is high.

The defective pixel information is registered in each of the defective pixel information data 57a to 57c, by an inspection device 67. The inspection device 67 has basically the same configuration as that in the inspection device 59 in the second embodiment, except that the inspection device 67 includes a threshold value information table 68 and a determination processing unit 69.

In the threshold value information table 68, the threshold values which are used in the previously described determination for each of the defective pixels are set according to each of ranges of the photographic gain ("ISO 100 or more and less than ISO 800, which is illustrated as ISO 100 in the figure", "ISO 800 or more and less than ISO 6400, which is illustrated as ISO 800 or more in the figure", and "ISO 6400 or more").

As the photographic gain is higher, the dark output of each of the pixels increases, and accordingly the defective pixel becomes easily detected. Because of this, unless the threshold value is set to be higher as the photographic gain is higher, the registration number of the defective pixels increases, a time period in which the defective pixel information is read out from the memory unit 27 results in increasing, and a time period to be required to the interpolation processing of the defective pixel results in increasing. In addition, in an object having high frequency, there is a possibility that the defective pixels are incorrectly interpolated by the interpolation processing of the defective pixel. Because of this, each of the threshold values is set to become higher as the photographic gain is higher. Incidentally, as the photographic gain is higher, the defective pixel is buried more in noise, and accordingly each of the threshold values is set to be lower than gain times.

The determination processing unit 69 determines whether each of the pixels is the defective pixel or not within the range of each of the ISO sensitivities, based on the threshold value determined according to the range of each of the ISO sensitivities in the threshold value information table 68, and the pixel value (dark output) of each of the pixels; and when the pixel is the defective pixel, the determination processing unit 69 determines the type.

Registration Processing of Defective Pixel Information in Third Embodiment

Figure 21:
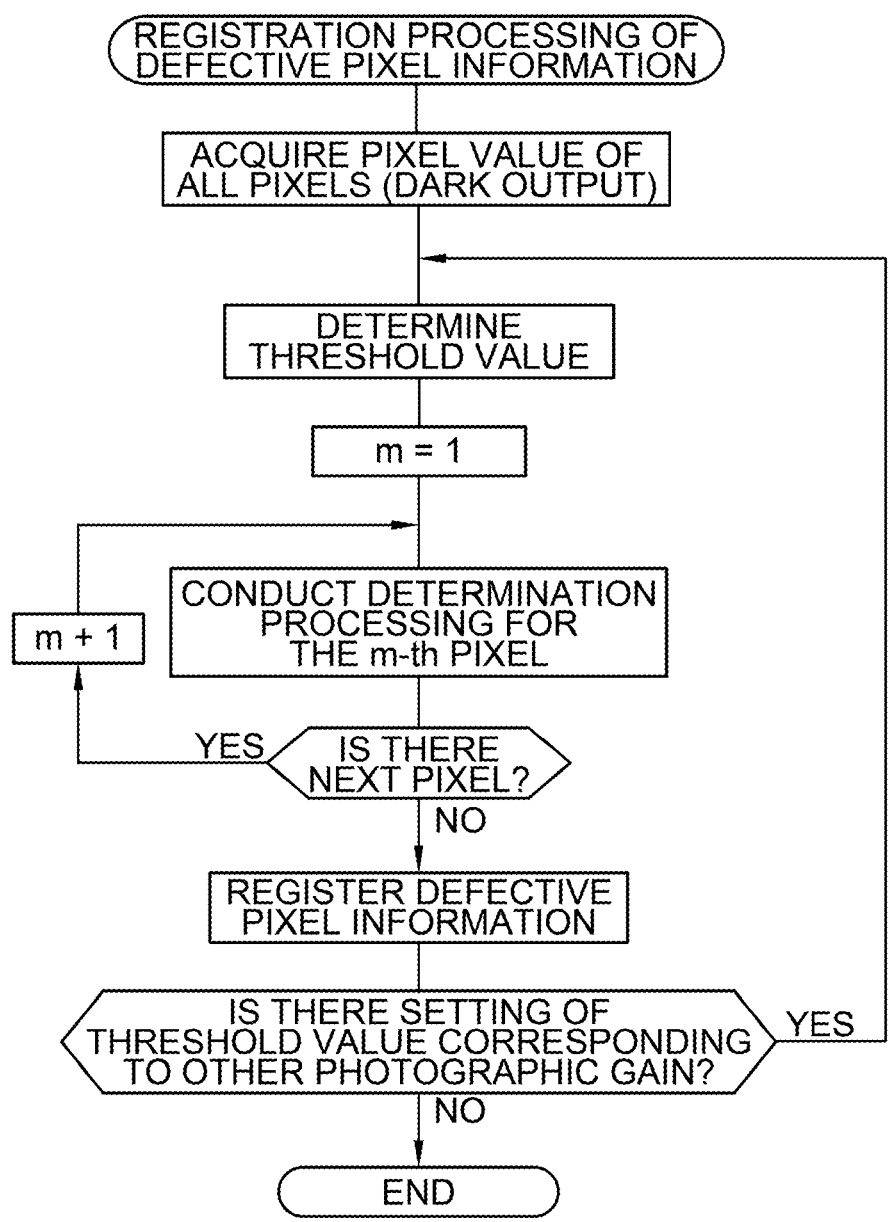
FIG. 21 is a flowchart illustrating a flow of registration processing of defective pixel information of the third embodiment.

As is illustrated in FIG. 21, after the pixel values of all the pixels have been acquired, the determination processing unit 69 firstly determines each of the threshold values which are set at "ISO 100 or more and less than ISO 800" in the threshold value information table 68, as a threshold value which is used in the defective pixel determining processing. Then, the determination processing unit 69 performs the defective pixel determining processing for all the pixels as is illustrated in FIG. 18, based on the determined threshold value and the pixel value (dark output) of each of the pixels.

Subsequently, the registration processing unit 62 registers the defective pixel information concerning the pixel which has been determined as the defective pixel by the determination processing unit 69, in the first defective pixel information data 57a, similarly to the second embodiment. After this registration processing, the determination processing unit 69 determines each of the threshold values which are set at "ISO 800 or more and less than ISO 6400" in the threshold value information table 68, as the threshold value which is used in the next defective pixel determining processing. In the following procedures, similarly, the defective pixel determining processing is performed by the determination processing unit 69, and the defective pixel information is registered in the second defective pixel information data 57b.

Furthermore, the defective pixel information is registered in the second defective pixel information data 57b, and then the defective pixel determining processing is performed based on the threshold value which is set at "ISO 6400 or more" in the threshold value information table 68, and the defective pixel information is registered in the third defective pixel information data 57c. The defective pixel information is registered in each of the defective pixel information data 57a, 57b and 57c so as to satisfy the previously described relation of ratio R4>ratio R3>ratio R5>ratio R2>ratio R1, similarly to the second embodiment.

Operation of Digital Camera of Third Embodiment

Figure 22:
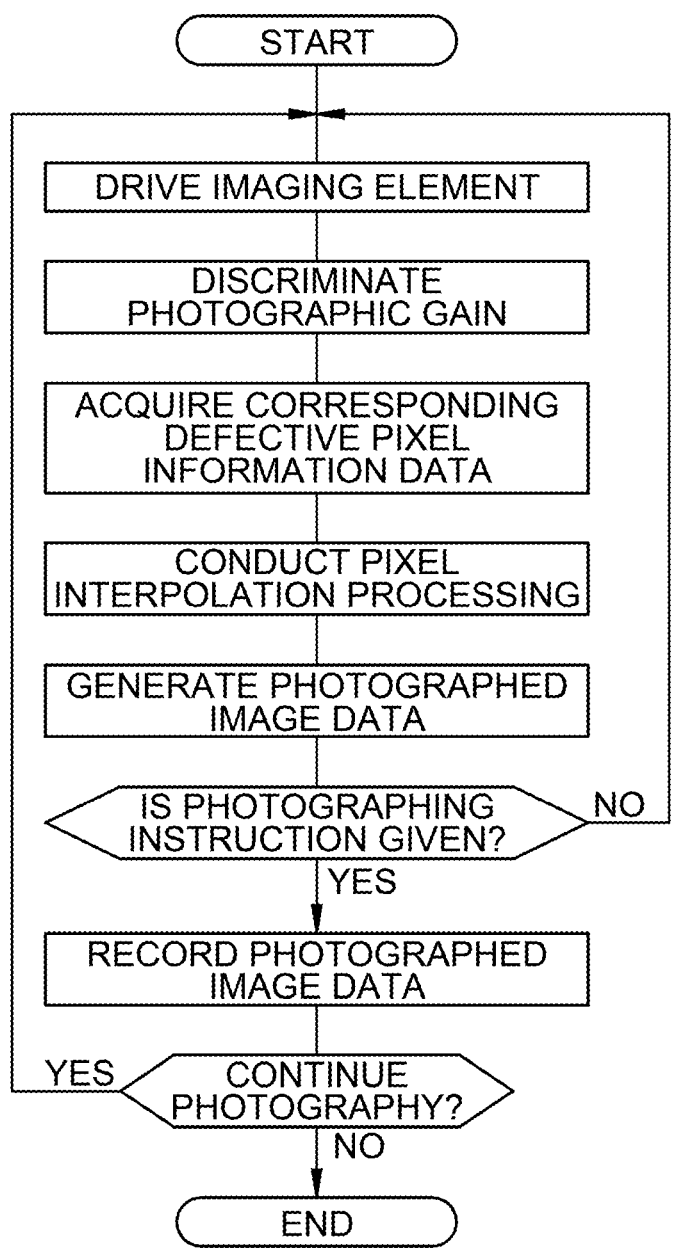
FIG. 22 is a flowchart for describing an operation of the digital camera of the third embodiment.

As is illustrated in FIG. 22, the operation of the digital camera 65 of the third embodiment is basically the same as the operation in the second (first) embodiment. However, the interpolation processing unit 26 of the digital camera 65 selects and acquires data corresponding to the photographic gain from each of the defective pixel information data 57a to 57c in the memory unit 27, based on the information on the photographic gain (in the present embodiment, ISO sensitivity) which has been acquired, for instance, from the CPU 11 and the like, and performs the interpolation processing of the defective pixels. The previously described interpolation processing of the defective pixels having the relatively higher priority is more preferentially performed than the interpolation processing of the defective pixels having the relatively lower priority, and accordingly the adequate photographed image data are obtained, similarly to the second embodiment.

Digital Camera of Embodiment 3-1

Figure 23:
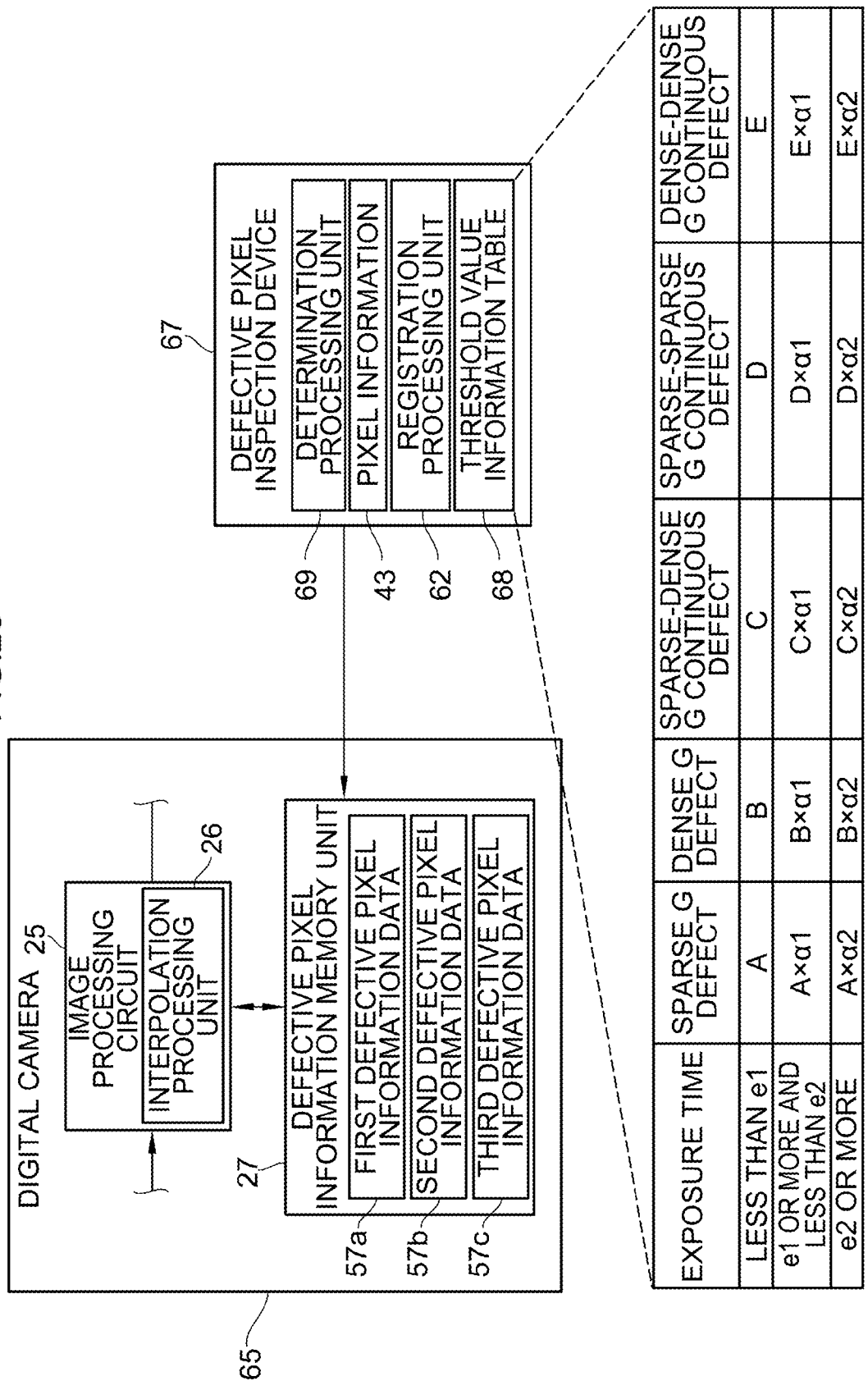
FIG. 23 is a block diagram illustrating an electric configuration of a digital camera of another embodiment of the third embodiment.

The above described digital camera 65 of the third embodiment performs the pixel interpolation processing by using the different defective pixel information data according to the photographic gain, but, for instance, as is illustrated in FIG. 23, may perform the interpolation processing by using the different defective pixel information data according to the exposure time of the color imaging element 20. This is because even when the exposure time is long, the dark output of each of the pixels results in increasing, similarly to the case where the photographic gain is high. Incidentally, the specific registration processing of the defective pixel information data and the interpolation processing of the defective pixels are the same as those in the third embodiment, and accordingly the description is omitted.

Digital Camera of Embodiment 3-2

Figure 24:
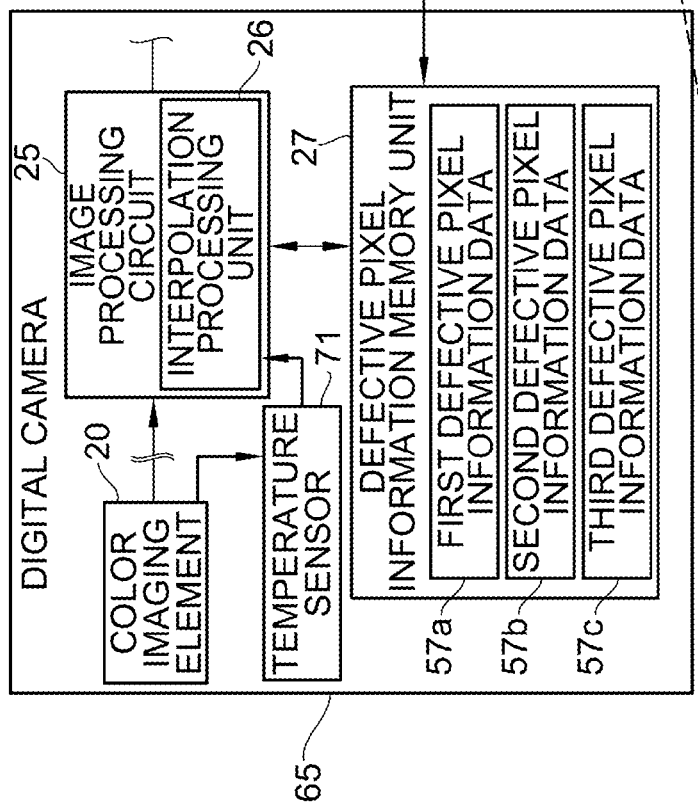
FIG. 24 is a block diagram illustrating an electric configuration of a digital camera of further another embodiment of the third embodiment.

In addition, as is illustrated in FIG. 24, the interpolation processing may be performed by using the different defective pixel information data according to a temperature of the color imaging element 20 (hereinafter referred to as element temperature). This is because the dark output of each of the pixels increases in the case as well where the element temperature is high, similarly to the case where the photographic gain is high.

The interpolation processing unit 26 in Embodiment 3-2 selects and acquires corresponding data from among each of the defective pixel information data 57a to 57c in the memory unit 27, based on the element temperature information given from the temperature sensor 71 which measures the element temperature, and performs the interpolation processing of the defective pixel. Incidentally, the registration processing of the defective pixel information and the interpolation processing of the defective pixel are the same as those in the third embodiment, and accordingly the description is omitted here.

Others of Embodiments 3, 3-1 and 3-2

In the above described Embodiments 3, 3-1 and 3-2, the photographing conditions such as the photographic gain, the exposure time and the element temperature are divided into ranges of three stages, and the defective pixel information data corresponding to the respective ranges are provided, but the photographing conditions may be divided into ranges of two stages or four or more stages, and the defective pixel information data may be provided for each of the ranges. In addition, each of the defective pixel information data memorized in the memory unit 27 may be collectively memorized as one data.

In the above described Embodiments 3, 3-1 and 3-2, the photographic gain, the exposure time and the element temperature have been taken as the photographing conditions which exert an influence on the dark output of the pixel, as an example, but the different defective pixel information data corresponding to various types of the photographing conditions may be provided which exert an influence on the dark output of the pixel, other than those photographing conditions. Incidentally, the threshold value which is used for the determination of the defective pixel is also similar to the defective pixel information data.

Configuration of Digital Camera of Fourth Embodiment

Next, a digital camera 75 of a fourth embodiment of the presently disclosed subject matter will be described with reference to FIG. 25. In the above described digital camera 10 of the first embodiment, the priority among the sparse G defective pixels is not provided in the interpolation processing and the registration processing of the defective pixel information, but in the digital camera 75, the priority among each of the sparse G defective pixels is also provided in the interpolation processing and the registration processing.

The digital camera 75 has basically the same configuration as that in the first embodiment, except that defective pixel information data 76 which is different from that of the digital camera 10 in the first embodiment is stored in the memory unit 27. For this reason, units having the same function and configuration as those in the above described first embodiment are designated by the same reference characters and numerals, and the description is omitted. In addition, the type of the defective pixel to be described will be limited only to the sparse G defective pixel, so as to prevent the complication of the description.

In the defective pixel information data 76, the defective pixel information on the sparse G defective pixel is registered preferentially in a descending order of an evaluation value which has been determined for each of the sparse G defective pixels. This evaluation value is determined by an inspection device 78. The inspection device 78 determines the evaluation value according to the position and the number of G pixels (hereinafter referred to as close G pixel) which are further adjacent to the periphery of the R and B pixels that are adjacent to the periphery of the sparse G defective pixel.

As is illustrated in FIG. 26, when the sparse G pixel in an address (3, c) is the sparse G defective pixel and the close G pixel does not exist in the periphery, the pixel values of the missing G pixels corresponding to the positions of all the R and B pixels in the periphery are determined by using the pixel value of the sparse G defective pixel. Because of this, the sparse G defective pixel exerts the influence strongly on the pixel values of all the adjacent missing G pixels. In such a case, the evaluation value is set to be "1"×8=8.

As is illustrated in FIG. 27, when one piece of a close G pixel is in an address (1, e), the pixel value of the missing G pixel in an address (2, d) receives a half of the influence of the sparse G defective pixel. Because of this, the missing G pixel in the address (2, d) is set to be "0.5", and the other missing G pixels are set to be "1". Accordingly, the evaluation value is set to be 0.5+(1×7)=7.5.

As is illustrated in FIG. 28, when the close G pixel [address (2, e)] is in a position which is adjacent in the vertical direction (in the figure, lower part) of the missing G pixel in the address (2, d), the pixel value of this missing G pixel is more strongly affected by the close G pixel which is adjacent in the vertical direction (similarly to horizontal direction as well) than the sparse G defective pixel that is adjacent in the oblique direction. Because of this, if the horizontal and vertical directions are weighted so as to be twice as much as the oblique direction, the influence of the sparse G defective pixel on the missing G pixel becomes ⅓, and accordingly the missing G pixel in the address (2, d) is set to be "0.33". In addition, the missing G pixel in the address (3, d) is strongly affected by the sparse G defective pixel, and accordingly is set to be "0.67". The other missing G pixels are set to be "1". As a result, the evaluation value becomes 0.33+0.67+(1×6)=7.

As is illustrated in FIG. 29, in the case as well where the close G pixels are each in addresses (2, e) and (3, e), the missing G pixels in the addresses (2, d), (3, d) and (4, d) are set to be "0.25", "0.4" and "0.5", respectively, on a similar principle, and the other missing G pixels are set to be "1". As a result, the evaluation value becomes 0.25+0.4+0.5+(1×5)=6.15.

As is illustrated in FIG. 30, in the case as well where the close G pixels are in the addresses (2, e), (3, e) and (4, e), the missing G pixels in the addresses (2, d), (3, d) and (4, d) are set to be "0.25", "0.16" and "0.25", respectively, on a similar principle, and the other missing G pixels are set to be "1". As a result, the evaluation value becomes 0.25+0.16+0.25+(1×5)=5.66.

Thus, the evaluation value is determined according to the position and the number of the close pixels. Incidentally, in the above described calculation for the evaluation value, the weighting of the close G pixels which are adjacent in the horizontal and vertical directions is determined to be twice as much as the weighting of the close G pixels that are adjacent in the oblique direction, but the quantity of the weighting may be appropriately changed.

Figure 25:
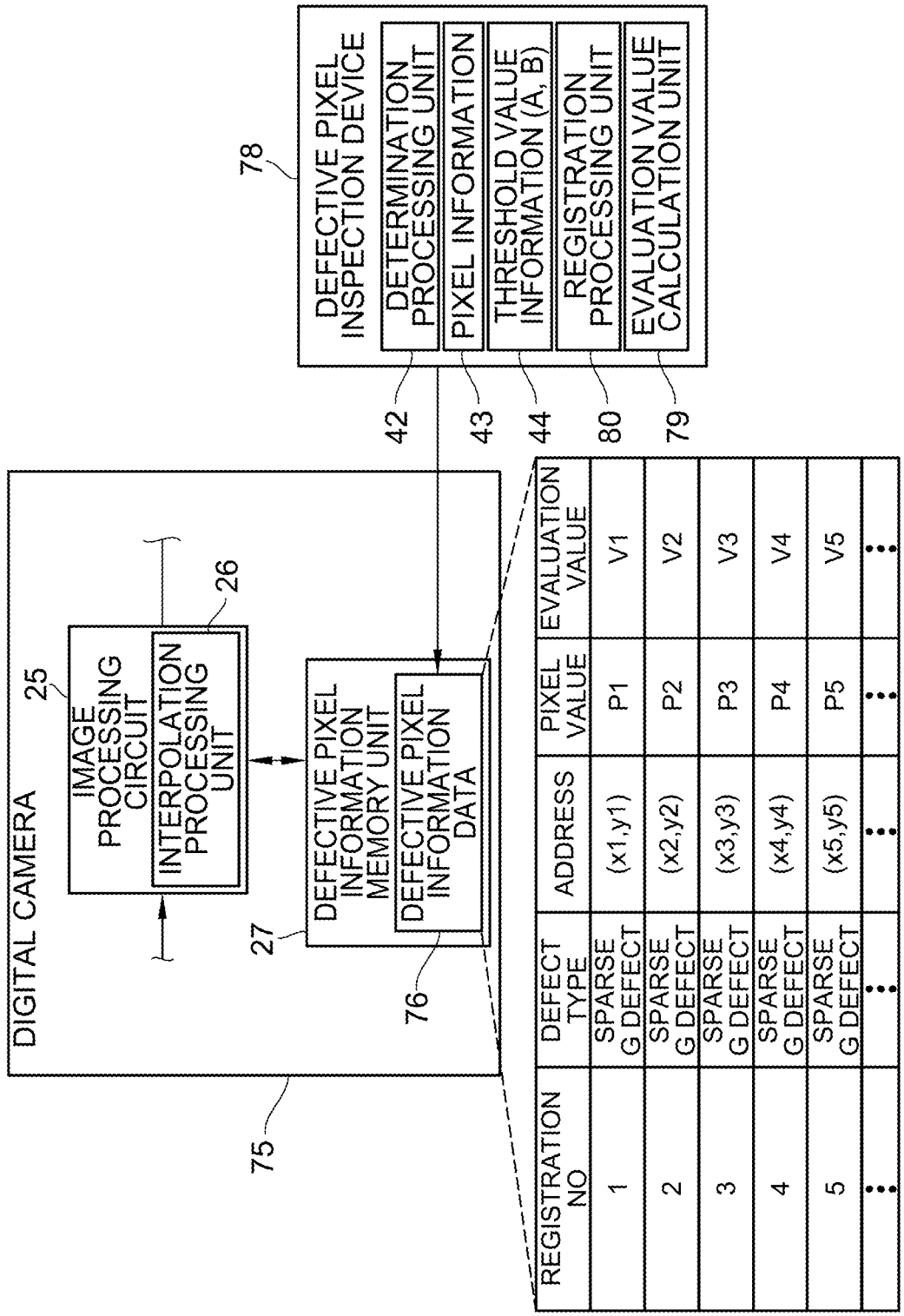
FIG. 25 is a block diagram illustrating an electric configuration of a digital camera of a fourth embodiment.

The description returns to FIG. 25. The inspection device 78 is basically the same as the inspection device 40 in the first embodiment, except that the inspection device 78 includes an evaluation value calculation unit 79 and a registration processing unit 80. When the determination processing unit 42 has determined that the pixel to be inspected is "sparse G defective pixel", the evaluation value calculation unit 79 calculates the evaluation value, as illustrated in the previously described FIG. 26 to FIG. 30.

The registration processing unit 80 registers the defective pixel information on the sparse G defective pixel more preferentially than the defective pixel information on the dense G defective pixel, in the defective pixel information data 76, in a similar way to the registration processing unit 45 in the first embodiment. Furthermore, when registering the defective pixel information concerning the sparse G defective pixel, the registration processing unit 80 preferentially registers the defective pixel information having a higher evaluation value therein which has been calculated by the evaluation value calculation unit 79.

Here, "preferential registration" means that the defective pixel information is registered so that a ratio of "registration number of sparse G defective pixel having relatively higher evaluation value" with respect to "total pixel number of sparse G pixels" becomes higher than a ratio of "registration number of sparse G defective pixels having relatively lower evaluation value" with respect to "total pixel number of sparse G pixels". Incidentally, the defective pixel information on the sparse G defective pixel having the relatively higher evaluation value may be registered in the defective pixel information data 76, prior to the defective pixel information on the sparse G defective pixel having the relatively lower evaluation value.

Incidentally, the registration processing of the defective pixel information in the fourth embodiment is, as has been previously described, basically the same as that in the above described first embodiment, except that the defective pixel information on the sparse G defective pixel having the relatively higher evaluation value is preferentially registered in the defective pixel information data 76, and accordingly the description is omitted here. In addition, the operation of the digital camera 75 of the fourth embodiment is also basically the same as that in the first embodiment illustrated in FIG. 9, and accordingly the description is omitted here. In the digital camera 75, the defective pixel information on the pixel which has a large influence (which has high evaluation value) on the pixel value of the missing G pixel in the periphery out of the sparse G defective pixels is preferentially registered in the defective pixel information data 76 and is preferentially subjected to the interpolation processing, and accordingly more adequate photographed image data are obtained.

Others in Fourth Embodiment

In the above described forth embodiment, the case has been taken as an example where the priority is provided on the pixel interpolation processing and the registration processing for the sparse G defective pixel, but the priority may be provided on the pixel interpolation processing and the registration processing also for other types of G defective pixels, similarly. Incidentally, the above description can also be applied to defects of the R and B pixels similarly.

Configuration of Digital Camera of Fifth Embodiment

Figure 31:
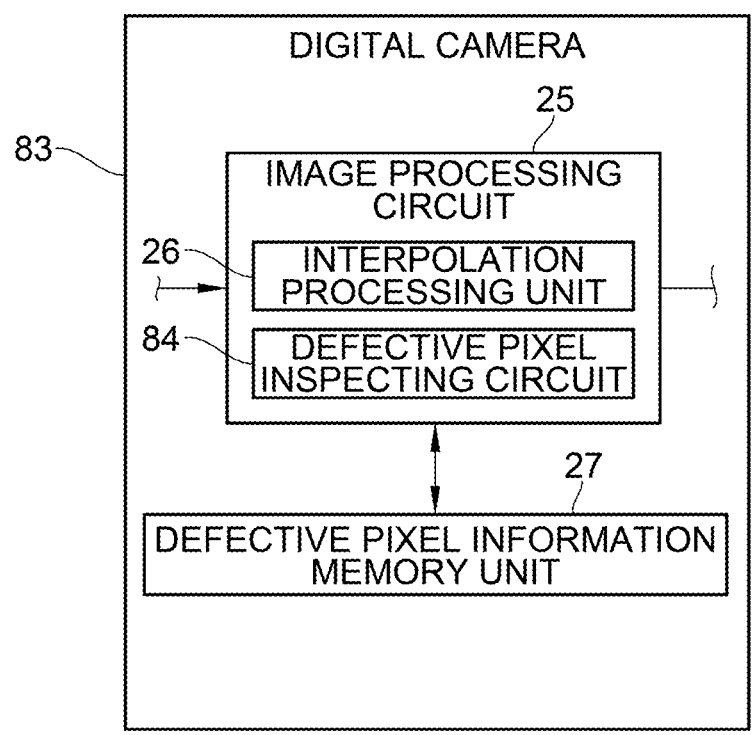
FIG. 31 is a block diagram illustrating an electric configuration of a digital camera of a fifth embodiment.

Next, a digital camera 83 of a fifth embodiment of the presently disclosed subject matter will be described with reference to FIG. 31. In the digital camera in each of the above described embodiments, the defective pixel information which has been obtained by an external inspection device is registered in the defective pixel information data, but the digital camera 83 has a function of performing the determination for the defective pixel and the registration for the defective pixel information.

The digital camera 83 has basically the same configuration as the digital camera 10 in the first embodiment except that the digital camera 83 has a defective pixel inspection circuit 84, for instance, in the image processing circuit 25. The defective pixel inspection circuit 84 has a function equivalent to any of the inspection devices 40, 59, 67 and 78 in each of the above described embodiments. When a power source of the digital camera 75 has been turned on, when the operation mode has been switched to the photographing mode, or at an arbitrary timing of every fixed period, the defective pixel inspection circuit 84 performs the previously described determination processing and registration processing for the defective pixel. Thereby, the digital camera 83 can cope with the defect of the pixel, which has newly occurred by a change with time, in other words, is a so-called later-occurring defect.

Others

Figure 20:
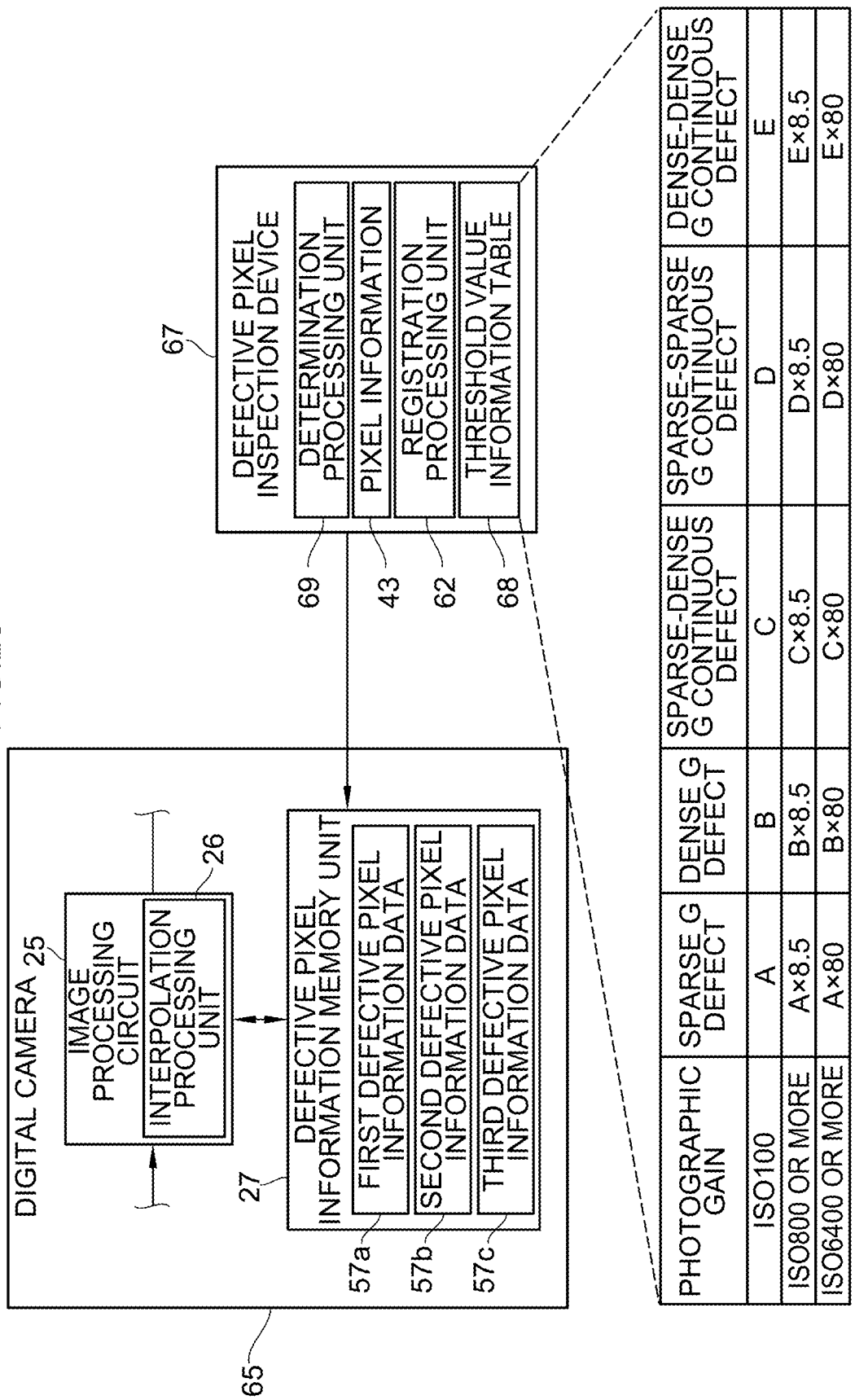
FIG. 20 is a block diagram illustrating an electric configuration of a digital camera of a third embodiment.
Figure 32:
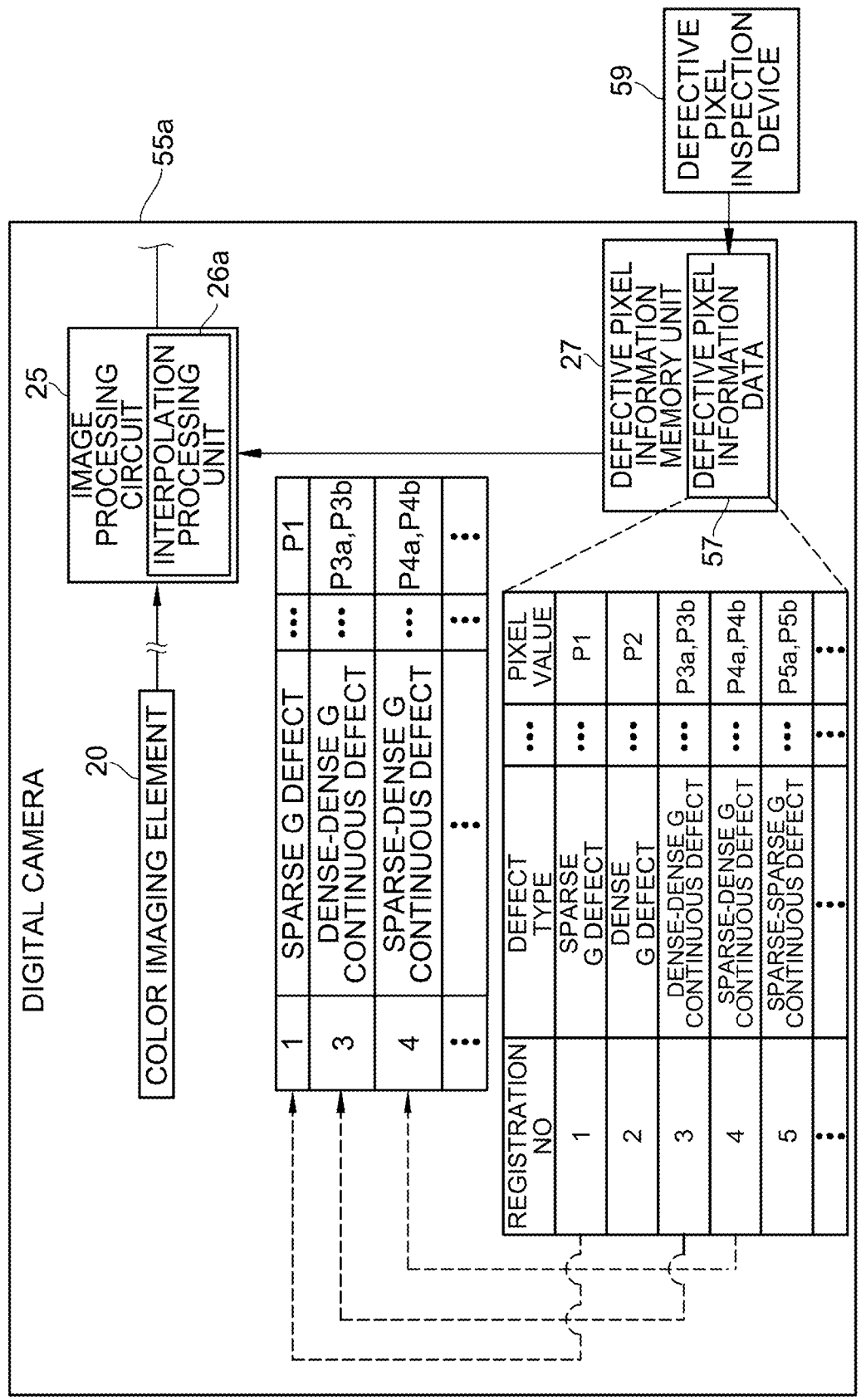
FIG. 32 is a block diagram illustrating an electric configuration of a digital camera of further another embodiment of the third embodiment.

In the digital camera 65 in the above described third embodiment, as has been illustrated in FIG. 20, different defective pixel information data according to the photographing conditions (for instance, photographic gain, exposure time and element temperature) are stored in the memory unit 27, the defective pixel information data corresponding to the photographing conditions are acquired from this memory unit 27, and the pixel interpolation processing is performed. However, the presently disclosed subject matter is not limited to this method. As in the digital camera 55a illustrated in FIG. 32, for instance, the defective pixel information data 57 may be provided as one data, and the defective pixel information corresponding to the photographing conditions may be taken out from this defective pixel information data 57.

In the defective pixel information data 57, the defective pixel information on the defective pixel is registered which occurs in any of each of the photographing conditions (range of photographing condition illustrated in FIG. 20 and the like) when the photographing condition has been changed.

The interpolation processing unit 26a acquires information on the defective pixels of which the pixel values become the previously determined threshold value or larger, for instance, for each of the photographing conditions (type and range of photographing condition) and for each of the types of the defective pixels, out of the defective pixel information which is registered in the defective pixel information data 57, and performs the pixel interpolation processing. Alternatively, the interpolation processing unit 26a, for instance, multiplies the pixel value of each of the defective pixel information which is registered in the defective pixel information data 57, by a previously determined coefficient or function for each of the photographing conditions and for each of the types of the defective pixels, and acquires information on the defective pixels of which the pixel values after having been multiplied by the coefficient or the like becomes a predetermined value or larger. Incidentally, the method for acquiring the defective image information corresponding to the photographing condition is not limited to the above described method, and various methods can be adopted.

Thus, also when the defective pixel information corresponding to the photographing condition is acquired from one defective pixel information data 57, a similar effect to that in the previously described third embodiment is obtained.

Incidentally, also in the digital camera 55a, the determination for the defective pixel and the registration of the defective pixel information may be performed in a similar way to that in the digital camera 65 in the fifth embodiment. In this case, the digital camera 55a may, for instance, previously memorize pixel values of all the pixels therein; determine a pixel of which the pixel value becomes the previously described threshold value or larger, or of which the pixel value multiplied by the previously described coefficient or the like becomes a predetermined value or larger, as the defective pixel; and acquire the defective pixel information concerning this defective pixel. In this case as well, the processing time period concerning the interpolation processing is prevented from increasing.

Figure 33:
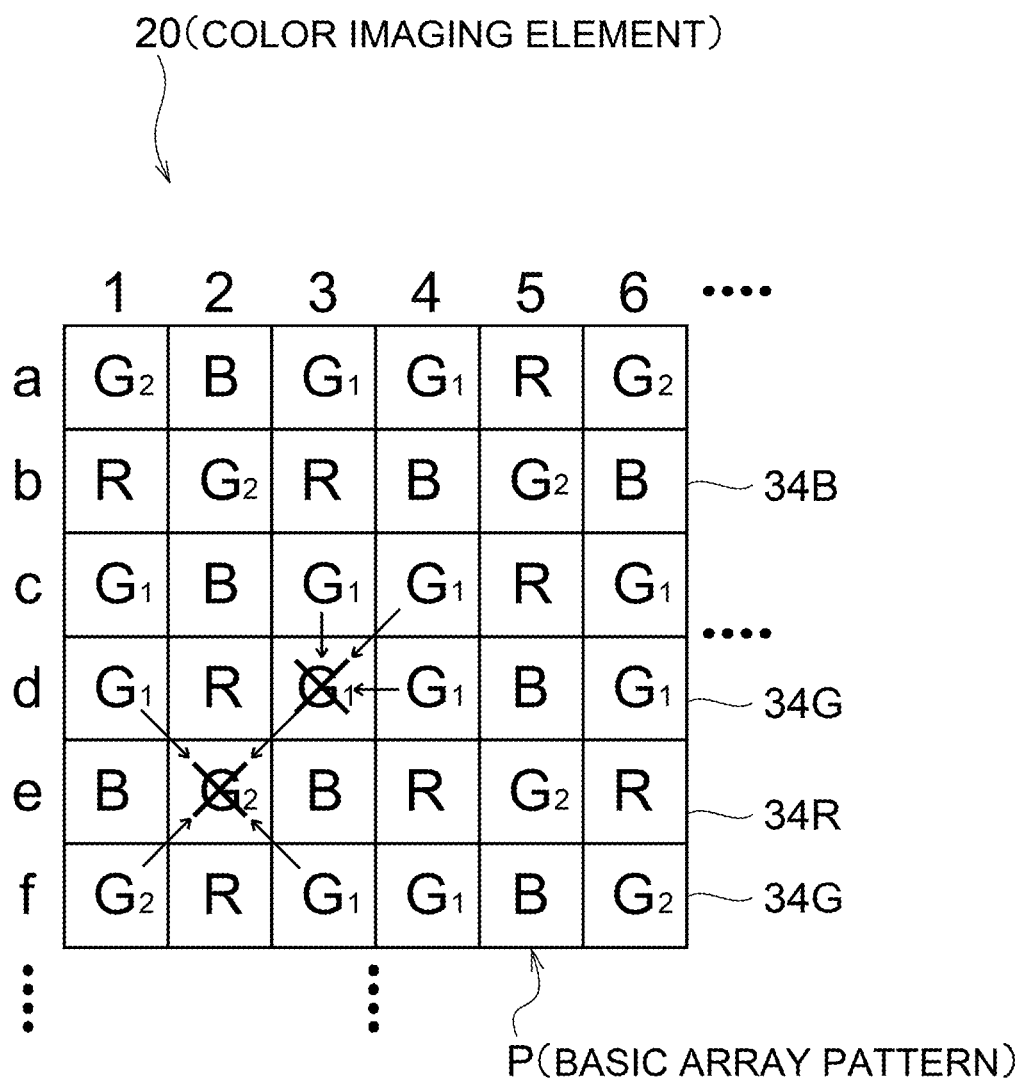
FIG. 33 is an explanatory drawing for describing an interpolation processing which is different from interpolation processing of pixel values of the sparse-dense G continuous defective pixels illustrated in FIG. 15.

In the above described second embodiment, when the pixel values of the sparse-dense G continuous defective pixels are subjected to interpolation processing, the pixel values of the three G pixels which are adjacent to the sparse G defective pixel and the dense G defective pixel, respectively, are used in the interpolation processing, as is illustrated in FIG. 15, but the presently disclosed subject matter is not limited to this method. For instance, as is illustrated by an arrow in FIG. 33, the pixel value of the dense G defective pixel is previously determined by the interpolation processing, and then the pixel value of the sparse G defective pixel may be determined by the interpolation processing which uses this pixel value and the pixel value of other G pixels that are adjacent to the sparse G defective pixel in an oblique direction.

The color filter array of the color imaging element of the presently disclosed subject matter is not limited to the array pattern illustrated in FIG. 2 and the like, and may be such an array pattern that a color filter of at least one color includes "sparse filter" and "dense filter". For instance, the color filter array includes a basic array pattern that is an array pattern corresponding to N×N pixels (N is three or more) which are repeatedly arranged in the horizontal and vertical directions, and the G filter 34G (filter of first color) may be arranged along two diagonal lines of this basic array pattern. In this case, the color filter array includes a square array in which the G filters 34G (filter of first color) are arranged so as to be adjacent to each other in the horizontal and vertical directions in an array pattern corresponding to 2×2 pixels, and an isolated array of the G filter 34G (filter of first color).

In each of the above described second and subsequent embodiments, the case has been described where the G pixel (G filter 34G) includes "sparse G pixel (sparse G filter 34G)" and "dense G pixel (dense G filter 34G)", but the R and B pixels (R and B filters 34R and 34B) may include "sparse R and B pixel (sparse R filter 34R and 34B)" and "dense R and B pixel (dense R filter 34R and 34B)". Furthermore, in all the embodiments, the pixels (color filter) of two or more colors may include "sparse pixel (sparse filter)" and "dense pixel (dense filter)".

In the above described first embodiment, it is defined to preferentially perform the interpolation processing and registration of the sparse G defective pixel, as setting the relation of "ratio R2 of interpolation processing number and registration number of sparse G defective pixels">"ratio R1 of interpolation processing number and registration number of dense G defective pixels", but the presently disclosed subject matter is not limited to the definition. For instance, it may be defined as higher priority to perform "interpolation processing and registration of sparse G defective pixel", prior to "interpolation processing and registration of dense G defective pixel". As has been previously described, there is an upper limit in the interpolation processing number and registration number of the defective pixels in the digital camera, and accordingly when "interpolation processing and registration of sparse G defective pixel" has been previously performed, the previously described expression of ratio R2>ratio R1 holds. Furthermore, also in each of the embodiments other than the first embodiment, the interpolation processing and registration of the defective pixels having the relatively higher priority may be performed prior to the interpolation processing and registration of the defective pixels having the relatively lower priority.

In addition, in the above described first embodiment, it may be defined as "preferential interpolation processing and registration" to set "interpolation processing number and registration number of sparse G defective pixels" so as to be larger than "interpolation processing number and registration number of dense G defective pixels". Furthermore, also in each of the embodiments other than the first embodiment, the numbers may be set so that "interpolation processing number and registration number of defective pixels having relatively higher priority">"interpolation processing number and registration number of defective pixels having relatively lower priority" holds.

In each of the above described embodiments, the color filter array of color filters having trichromatic colors of RGB has been described, but the color filter array may be, for instance, an array of color filters having four colors of the trichromatic colors of RGB+another color (for instance, emerald (E)). The type of the color filter is not limited in particular. In addition, the presently disclosed subject matter can be applied also to the color filter array of color filters of C (cyan), M (magenta) and Y (yellow) which are complementary colors of the elementary colors of RGB.

In each of the above described embodiments, the digital camera has been taken as an example of an imaging device provided with the color imaging element of the presently disclosed subject matter, and has been described, but the presently disclosed subject matter can be applied to various types of imaging devices such as an endoscope, for instance.

Furthermore, it goes without saying that the presently disclosed subject matter is not limited to the above described embodiments, and can be modified in various ways in such a range as not to deviate from the concept of the invention.

What is claimed is:

1. An imaging device comprising:
a color imaging element in which color filters of a plurality of colors are arranged on a plurality of pixels that are formed of photoelectric conversion elements, respectively, which are arrayed in a horizontal direction and a vertical direction, in accordance with a predetermined color filter array, wherein color filters of at least one color include a sparse filter in which a first adjacent number of adjacent color filters having a same color in the horizontal direction and vertical direction is relatively small, or a second adjacent number of adjacent color filters having a same color in an oblique direction is relatively small, when both of the first adjacent number is M ($0 \leq M \leq 4$), and a dense filter in which the first adjacent number or the second adjacent number is relatively large, and the plurality of pixels include a sparse pixel corresponding to the sparse filter and a dense pixel corresponding to the dense filter;
an acquiring unit configured to acquire a piece of defective pixel information concerning a defective pixel that is included in the plurality of pixels and includes a sparse defective pixel corresponding to the sparse filter and a dense defective pixel corresponding to the dense filter; and
an interpolating unit configured to determine a pixel value of the defective pixel from a pixel value of a peripheral pixel which is positioned in a lower part of the color filter that is in a periphery of the defective pixel and has a same color as that of the defective pixel by interpolation processing based on the piece of defective pixel information which has been acquired by the acquiring unit, the interpolating unit configured to set a second ratio of the sparse defective pixel to be interpolated with respect to a total pixel number of the sparse pixels so as to become higher than a first ratio of the dense defective pixel to be interpolated with respect to a total pixel number of the dense pixels.

2. The imaging device according to claim 1, further comprising
a defective pixel information memory unit configured to register pieces of defective pixel information therein, and set a ratio of a registration number of the pieces of defective pixel information on the sparse defective pixel with respect to the total pixel number of the sparse pixels so as to become higher than a ratio of a registration number of the pieces of defective pixel information on the dense defective pixel with respect to the total pixel number of the dense pixels,
wherein the acquiring unit acquires the piece of defective pixel information from the defective pixel information memory unit.

3. The imaging device according to claim 2,
wherein the defective pixel information memory unit has the piece of defective pixel information on the defective pixel registered therein which occurs in any one of each photographing condition when photographing conditions have been changed, and
the acquiring unit acquires a piece of defective pixel information which corresponds to the photographing condition, from the defective pixel information memory unit.

4. The imaging device according to claim 3,
wherein the photographing condition includes at least one of a gain, an exposure time, and a temperature of the color imaging element.

5. The imaging device according to claim 1,
wherein the color filter array has a square array in which the color filters of the one color are arranged so as to be adjacent to each other in an array pattern corresponding to 2×2 pixels or more, and an isolated array in which the color filter of the one color is arranged so as to be adjacent to the color filters of other colors different from the one color in the horizontal direction and the vertical direction.

6. The imaging device according to claim 5,
wherein the color filters of the one color are a first filter corresponding to a first color which contributes most to an acquisition of a luminance signal,
the color filter array includes a basic array pattern in which the first filter and a second filter corresponding to a second color which includes two or more colors other than the first color are arrayed in an array pattern corresponding to N×N (N: 3 or larger odd number) pixels, and the basic array pattern is arranged repeatedly in the horizontal direction and the vertical direction.

7. The imaging device according to claim 6,
wherein the first filter is arranged on two diagonal lines in the basic array pattern, and
the color filter array includes a square array that is an array pattern corresponding to 2×2 pixels, which are formed of the first filter.

8. The imaging device according to claim 5,
wherein the plurality of pixels include a plurality of first continuous pixels in which the sparse pixel and the dense pixel are adjacent to each other in any of each direction of the horizontal direction, vertical direction and oblique direction, and
when the defective pixel includes the first continuous defective pixels in which the sparse defective pixel and the dense defective pixel are adjacent to each other in any of the each direction, based on the piece of defective pixel information, the interpolating unit sets a third ratio of the first continuous defective pixels to be interpolated with respect to a total number of the first continuous pixels so as to become higher than the second ratio.

9. The imaging device according to claim 5,
wherein the plurality of pixels include a plurality of second continuous pixels in which two of the sparse pixels are close to each other in any of each direction of the horizontal direction, vertical direction and oblique direction, and
when the defective pixel includes the second continuous defective pixels in which the two of the sparse defective pixels are close to each other in any of the each direction, based on the piece of defective pixel information, the interpolating unit sets a fourth ratio of the second continuous defective pixels to be interpolated with respect to a total number of the second continuous pixels so as to become higher than the second ratio.

10. The imaging device according to claim 5,
wherein the plurality of pixels include a plurality of third continuous pixels in which two of the dense pixels are adjacent or close to each other in any of each direction of the horizontal direction, vertical direction and oblique direction, and
when the defective pixel includes the third continuous defective pixels in which the two of the dense defective pixels are adjacent or close to each other in any of the each direction, based on the piece of defective pixel information, the interpolating unit sets a fifth ratio of the third continuous defective pixels to be interpolated with respect to a total number of the third continuous pixels so as to become higher than the second ratio.

11. The imaging device according to claim 5,
wherein the plurality of pixels include a plurality of first continuous pixels in which the sparse pixel and the dense pixel are adjacent to each other in any of each direction of the horizontal direction, vertical direction and oblique direction, and a plurality of second continuous pixels in which the two sparse pixels are close to each other in any of the each direction, and
when the defective pixel includes the first continuous defective pixels in which the sparse defective pixel and the dense defective pixel are adjacent to each other in any of the each direction, and the second continuous defective pixels in which the two sparse defective pixels are close to each other in any of the each direction, based on the piece of defective pixel information, the interpolating unit sets a fourth ratio of the second continuous defective pixels to be interpolated with respect to a total number of the second continuous pixels so as to become higher than a third ratio of the first continuous defective pixels to be interpolated with respect to a total number of the first continuous pixels.

12. The imaging device according to claim 11,
wherein the plurality of pixels include a plurality of third continuous pixels in which two of the dense pixels are adjacent or close to each other in any of each direction of the horizontal direction, vertical direction and oblique direction, and
when the defective pixel includes the first continuous defective pixels, the second continuous defective pixels and third continuous defective pixels in which the two of the dense defective pixels are adjacent or close to each other in any of the each direction, based on the piece of defective pixel information, the interpolating unit sets a fifth ratio of the third continuous defective pixels to be interpolated with respect to a total number of the third continuous pixels so as to be lower than the third ratio and the fourth ratio.

* * * * *